United States Patent
Yin et al.

(10) Patent No.: US 9,408,158 B2
(45) Date of Patent: Aug. 2, 2016

(54) SYSTEMS AND METHODS FOR FEEDBACK REPORTING

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 109 days.

(21) Appl. No.: 14/214,560

(22) Filed: Mar. 14, 2014

(65) Prior Publication Data

US 2015/0264678 A1 Sep. 17, 2015

(51) Int. Cl.
| | |
|---|---|
| H04W 28/02 | (2009.01) |
| H04W 52/22 | (2009.01) |
| H04W 72/04 | (2009.01) |
| H04L 1/00 | (2006.01) |
| H04L 5/00 | (2006.01) |
| H04W 72/02 | (2009.01) |

(52) U.S. Cl.
CPC .............. *H04W 52/22* (2013.01); *H04L 1/00* (2013.01); *H04L 5/00* (2013.01); *H04W 72/02* (2013.01)

(58) Field of Classification Search
None
See application file for complete search history.

(56) References Cited

U.S. PATENT DOCUMENTS

| | | | | |
|---|---|---|---|---|
| 2012/0113831 | A1* | 5/2012 | Pelletier et al. | 370/252 |
| 2012/0257552 | A1* | 10/2012 | Chen et al. | 370/280 |
| 2013/0194980 | A1 | 8/2013 | Yin et al. | |
| 2013/0279441 | A1 | 10/2013 | Lee et al. | |
| 2013/0301490 | A1 | 11/2013 | He et al. | |
| 2013/0336299 | A1 | 12/2013 | Lee et al. | |
| 2013/0336302 | A1 | 12/2013 | Lee et al. | |

(Continued)

FOREIGN PATENT DOCUMENTS

| | | |
|---|---|---|
| EP | 2606697 A1 | 6/2013 |
| WO | 2013166689 A1 | 11/2013 |

OTHER PUBLICATIONS

3GPP TS 36.211 V12.0.0, Evolved Universal Terrestrial Radio Access (E-UTRA) Physical Channels and Modulation, (Release 12), Dec. 2013.
3GPP TS 36.213 V11.4.0, Evolved Universal Terrestrial Radio Access (E-UTRA); Physical layer procedures (Release 11), Sep. 2013.

(Continued)

*Primary Examiner* — Chi H Pham
*Assistant Examiner* — Soon-Dong D Hyun
(74) *Attorney, Agent, or Firm* — Austin Rapp & Hardman

(57) ABSTRACT

A User Equipment (UE) is described. The UE decodes an uplink/downlink (UL/DL) reconfiguration downlink control information (DCI) with an enhanced interference mitigation with traffic adaptation (eIMTA)-radio network temporary identifier (RNTI) on a physical downlink control channel (PDCCH). The UE also determines if one or more valid UL/DL configurations in the UL/DL reconfiguration DCI with eIMTA-RNTI for all configured eIMTA cells are received. The UE further determines if physical uplink control channel (PUCCH) format 3 is configured. The UE additionally determines a PUCCH resource for physical downlink shared channel (PDSCH) hybrid automatic repeat request acknowledgement/negative acknowledgement (HARQ-ACK) reporting based on whether valid UL/DL configurations in the UL/DL reconfiguration DCI with eIMTA-RNTI for all of the configured eIMTA cells corresponding to a subframe for the PUCCH resource are received. The UE also sends PDSCH HARQ-ACK information on the selected PUCCH resource in an uplink subframe.

19 Claims, 12 Drawing Sheets

(56) References Cited

U.S. PATENT DOCUMENTS

| | | | |
|---|---|---|---|
| 2014/0022962 A1* | 1/2014 | Yang et al. | 370/280 |
| 2014/0050107 A1 | 2/2014 | Charbit et al. | |
| 2014/0301290 A1* | 10/2014 | He et al. | 370/329 |
| 2014/0376460 A1* | 12/2014 | Hooli et al. | 370/329 |
| 2015/0098366 A1* | 4/2015 | Wu | 370/278 |
| 2015/0124663 A1* | 5/2015 | Chen et al. | 370/278 |
| 2015/0195056 A1* | 7/2015 | He et al. | 370/329 |
| 2015/0222394 A1* | 8/2015 | Cheng et al. | 370/329 |
| 2015/0223234 A1* | 8/2015 | Seo et al. | 370/329 |

OTHER PUBLICATIONS

3GPP TS 36.212 V11.3.0, Evolved Universal Terrestrial Radio Access (E-UTRA); Multiplexing and channel coding (Release 11), Jun. 2013.

MCC Support, "A Final Report of 3GPP TSG RAN WG1 #75 v1.0.0 (San Francisco, USA, Nov. 11-15, 2013)," 3GPP TSG-RAN WG1 Meeting #76, R1-140001, Feb. 2014.

MCC Support, "Draft Report of 3GPP TSG RAN WG1 #76 v0.2.0," 3GPP TSG RAN WG1 Meeting #76bis, Shenzhen, China, Mar. 31-Apr. 4, 2014.

* cited by examiner

SYSTEMS AND METHODS FOR FEEDBACK REPORTING

TECHNICAL FIELD

The present disclosure relates generally to communication systems. More specifically, the present disclosure relates to systems and methods for feedback reporting.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
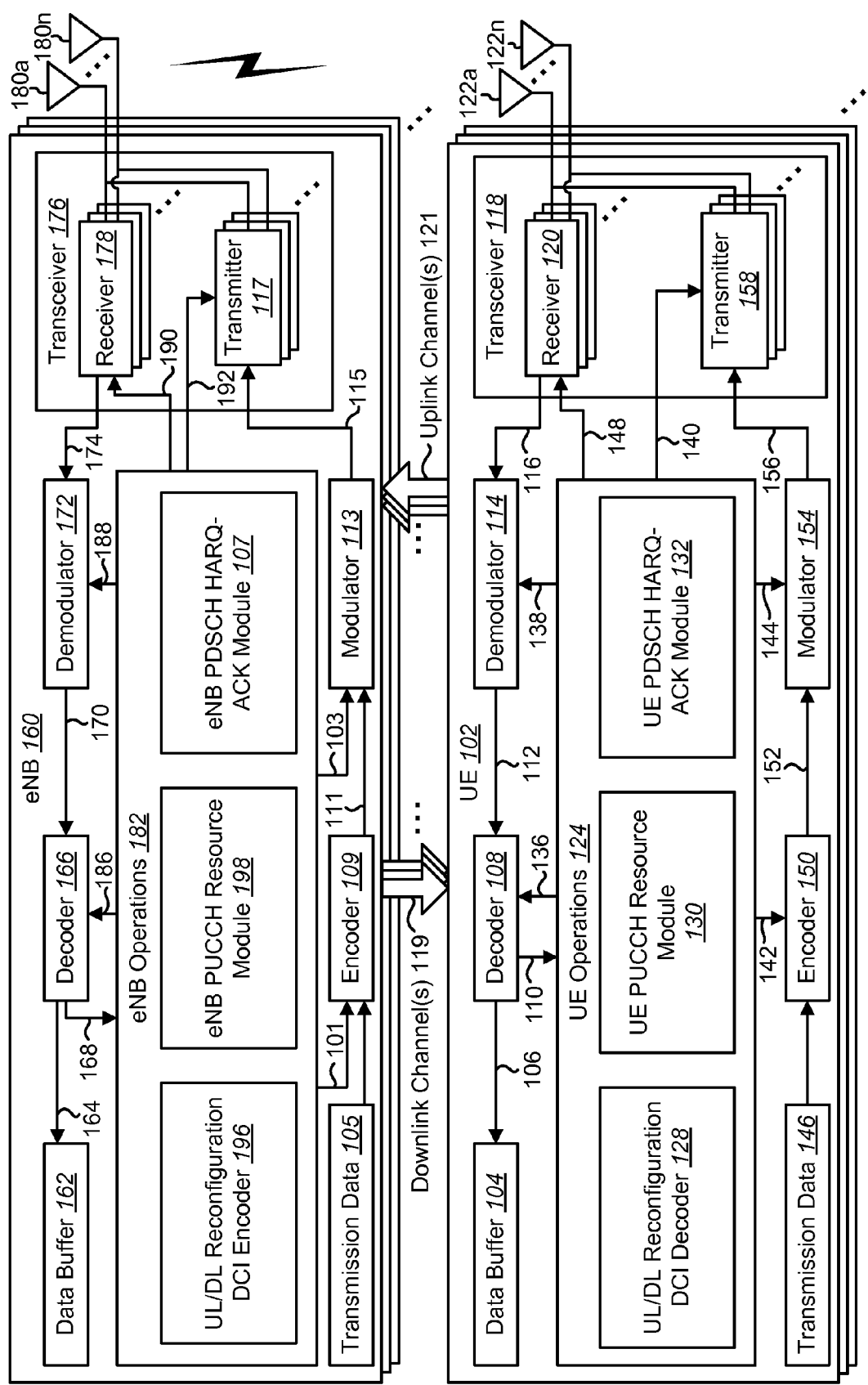
FIG. 1 is a block diagram illustrating one configuration of one or more evolved Node Bs (eNBs) and one or more user equipments (UEs) in which systems and methods for feedback reporting may be implemented.

A user equipment (UE) is described. The UE includes a processor and memory in electronic communication with the processor. The UE decodes an uplink/downlink (UL/DL) reconfiguration downlink control information (DCI) with an enhanced interference mitigation with traffic adaptation (eIMTA)-radio network temporary identifier (RNTI) on a physical downlink control channel (PDCCH). The UE also determines if one or more valid UL/DL configurations in the UL/DL reconfiguration DCI with eIMTA-RNTI for all configured eIMTA cells are received. The UE further determines if physical uplink control channel (PUCCH) format 3 is configured. The UE additionally determines a PUCCH resource for physical downlink shared channel (PDSCH) hybrid automatic repeat request acknowledgement/negative acknowledgement (HARQ-ACK) reporting based on whether valid UL/DL configurations in the UL/DL reconfiguration DCI with eIMTA-RNTI for all of the configured eIMTA cells corresponding to a subframe for the PUCCH resource are received. The UE also sends PDSCH HARQ-ACK information on the selected PUCCH resource in an uplink subframe.

If PUCCH format 3 is configured and valid UL/DL configurations in the UL/DL reconfiguration DCI with eIMTA-RNTI for all of the configured eIMTA cells corresponding to a subframe for the PUCCH resource are received, then the UE may determine the PDSCH HARQ-ACK information based on at least one of a DL subframe and a special subframe according to the UL/DL configuration in the UL/DL reconfiguration DCI in a DL association set for a given UL subframe of each configured eIMTA cell.

If PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received, then the UE may determine the PDSCH HARQ-ACK information based on at least one of a DL subframe and a special subframe according to a system information block type 1 (SIB1) configuration in a DL association set according to a DL HARQ reference configuration for a given UL subframe of each configured eIMTA cell. The SIB1 configuration may include a UL/DL configuration in SIB1 signaling or RadioResourceConfigCommon signaling when a configured eIMTA cell is a primary cell (PCell). The SIB1 configuration may include a UL/DL configuration in RadioResourceConfigCommonSCell-r10 signaling when a configured eIMTA cell is a secondary cell (SCell).

If PUCCH format 3 is configured and a valid UL/DL configuration in the UL/DL reconfiguration DCI with eIMTA-RNTI for at least one configured eIMTA cell corresponding to a subframe for the PUCCH resource is not received, then the UE may determine the PDSCH HARQ-ACK information based on a DL association set according to a DL HARQ reference configuration for a given UL subframe of each configured eIMTA cell.

If valid UL/DL configurations in the UL/DL reconfiguration DCI with eIMTA-RNTI of all configured eIMTA cells corresponding to a subframe for the PUCCH resource are received, then the UE may determine the PUCCH resource based on at least one of a Transmitter Power Control (TPC) field and an acknowledgment resource offset (ARO). If a PDSCH is detected on an SCell in a DL assignment by PDCCH/enhanced physical downlink control channel (EPDCCH), or a downlink assignment index (DAI) value is greater than 1 in a detected PDCCH on a primary cell (PCell), then the UE may determine a PUCCH format 3 resource based on a TPC field in a PDCCH/EPDCCH assignment with a DAI value greater than 1. If there is no PDSCH detected on an SCell and a DAI value is greater than 1 in a detected EPDCCH on a PCell, then the UE may determine a PUCCH format 3 resource based on a HARQ-ACK resource offset field in a DCI format of a corresponding EPDCCH assignment with a DAI value greater than 1. If there is only one PDSCH detected with a DAI value of 1, excluding semi-persistent scheduling (SPS) on a PCell, then the UE may determine a PUCCH format 1a/1b resource based on the number of control channel elements (CCE).

If at least one valid UL/DL configuration in the UL/DL reconfiguration DCI with eIMTA-RNTI for at least one configured eIMTA cell corresponding to a subframe for the PUCCH resource is not received, then the UE may determine the PUCCH resource based on at least one of a predefined offset or a separate PUCCH resource. If a PDSCH is detected on an SCell in a DL assignment by PDCCH/EPDCCH, or a DAI value is greater than 1 in a detected PDCCH on a PCell, then the UE may determine a PUCCH format 3 resource based on a predefined offset or a separate PUCCH resource and a TPC field in a PDCCH/EPDCCH assignment with a DAI value greater than 1. If there is no PDSCH detected on an SCell and a DAI value is greater than 1 in a detected EPDCCH on a PCell, then the UE may determine a PUCCH format 3 resource based on at least one of a predefined offset or a separate PUCCH resource and a HARQ-ACK resource offset field in a DCI format of a corresponding EPDCCH assignment with a DAI value greater than 1. If there is only one PDSCH detected with a DAI value of 1, excluding SPS on a PCell, then the UE may determine a PUCCH format 1a/1b resource based on the number of CCEs.

If valid UL/DL configurations in the UL/DL reconfiguration DCI with eIMTA-RNTI for all of the configured eIMTA cells corresponding to a subframe for the PUCCH resource are received, then the UE may determine the PUCCH resource based on at least one of a predefined offset or a separate PUCCH resource. If a PDSCH is detected on an SCell in a DL assignment by PDCCH/EPDCCH, or a DAI value is greater than 1 in a detected PDCCH on a PCell, then the UE may determine a PUCCH format 3 resource based on at least one of a predefined offset or a separate PUCCH resource and a TPC field in a PDCCH/EPDCCH assignment with a DAI value greater than 1. If there is no PDSCH detected on an SCell and a DAI value is greater than 1 in a detected EPDCCH on a PCell, then the UE may determine a PUCCH format 3 resource based on at least one of a predefined offset or a separate PUCCH resource and a HARQ-ACK resource offset field in a DCI format of a corresponding EPDCCH assignment with a DAI value greater than 1. If there is only one PDSCH detected with a DAI value of 1, excluding SPS, on a PCell, then the UE may determine a PUCCH format 1a/1b resource based on the number of CCEs.

If at least one valid UL/DL configuration in the UL/DL reconfiguration DCI with eIMTA-RNTI for at least one configured eIMTA cell corresponding to a subframe for the PUCCH resource is not received, then the UE may determine the PUCCH resource based on at least one of a TPC field and an ARO. If a PDSCH is detected on an SCell in a DL assignment by PDCCH/EPDCCH or a DAI value is greater than 1 in a detected PDCCH on a PCell, then the UE may determine a PUCCH format 3 resource based on a TPC field in a PDCCH/EPDCCH assignment with a DAI value greater than 1. If there is no PDSCH detected on an SCell and a DAI value greater than 1 in a detected EPDCCH on a PCell, then the UE may determine a PUCCH format 3 resource based on a HARQ-ACK resource offset field in a DCI format of a corresponding EPDCCH assignment with a DAI value greater than 1. If there is only one PDSCH detected with a DAI value of 1, excluding SPS, on a PCell, then the UE may determine a PUCCH format 1a/1b resource based on the number of CCE.

An evolved node B (eNB) is also described. The eNB includes a processor; and memory in electronic communication with the processor. The eNB transmits, to a UE, UL/DL reconfiguration DCI with an eIMTA-RNTI on a PDCCH. The eNB also assumes that the UE determines if one or more valid UL/DL configurations in the UL/DL reconfiguration DCI with eIMTA-RNTI for all of the configured eIMTA cells are received. The eNB further assumes that the UE determines if PUCCH format 3 is configured. The eNB additionally assumes that the UE determines a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource is received. The eNB also monitors potential PUCCH resources and receives PDSCH HARQ-ACK information on the detected PUCCH resource in an uplink subframe.

If PUCCH format 3 is configured and valid UL/DL configurations in the UL/DL reconfiguration DCI with eIMTA-RNTI for all of the configured eIMTA cells corresponding to a subframe for the PUCCH resource are received by the UE, then the eNB may assume that the UE determines the PDSCH HARQ-ACK information based on at least one of a DL subframe and a special subframe according to the UL/DL configuration in the UL/DL reconfiguration DCI in a DL association set for a given UL subframe of each configured eIMTA cell.

If PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received by the UE, then the eNB may assume that the UE determines the PDSCH HARQ-ACK information based on at least one of a DL subframe and a special subframe according to a SIB1 configuration in a DL association set according to a DL HARQ reference configuration for a given UL subframe of each configured eIMTA cell. The SIB1 configuration may include a UL/DL configuration in SIB1 signaling or RadioResourceConfigCommon signaling when a configured eIMTA cell is a PCell. The SIB1 configuration may include a UL/DL configuration in RadioResourceConfigCommonSCell-r10 signaling when a configured eIMTA cell is an SCell.

If PUCCH format 3 is configured and a valid UL/DL configuration in the UL/DL reconfiguration DCI with eIMTA-RNTI for at least one configured eIMTA cell corresponding to a subframe for the PUCCH resource is not received by the UE, then the eNB may assume that the UE determines the PDSCH HARQ-ACK information based on a DL association set according to a DL HARQ reference configuration for a given UL subframe of each configured eIMTA cell.

If valid UL/DL configurations in the UL/DL reconfiguration DCI with eIMTA-RNTI of all configured eIMTA cells corresponding to a subframe for the PUCCH resource are received by the UE, then the eNB may assume that the UE determines the PUCCH resource based on at least one of a TPC field and an ARO. If a PDSCH is detected, by the UE, on an SCell in a DL assignment by PDCCH/EPDCCH, or a DAI value is greater than 1 in a detected PDCCH on a PCell, then the eNB may assume that the UE determines a PUCCH format 3 resource based on a TPC field in a PDCCH/EPDCCH assignment with a DAI value greater than 1. If there is no PDSCH detected, by the UE, on an SCell and a DAI value is greater than 1 in a detected EPDCCH on a PCell, then the eNB may assume that the UE determines a PUCCH format 3 resource based on a HARQ-ACK resource offset field in a DCI format of a corresponding EPDCCH assignment with a DAI value greater than 1. If there is only one PDSCH detected, by the UE, with a DAI value of 1, excluding SPS on a PCell, then the eNB may assume that the UE determines a PUCCH format 1a/1b resource based on the number of CCEs.

If at least one valid UL/DL configuration in the UL/DL reconfiguration DCI with eIMTA-RNTI for at least one configured eIMTA cell corresponding to a subframe for the PUCCH resource is not received by the UE, then the eNB may assume that the UE determines the PUCCH resource comprise instructions executable to assume that the UE determines the PUCCH resource based on at least one of a predefined offset or a separate PUCCH resource. If a PDSCH is detected, by the UE, on an SCell in a DL assignment by PDCCH/EPDCCH, or a DAI value is greater than 1 in a detected PDCCH on a PCell, then the eNB may assume that the UE determines a PUCCH format 3 resource based on a predefined offset or a separate PUCCH resource and a TPC field in a PDCCH/EPDCCH assignment with a DAI value greater than 1. If there is no PDSCH detected, by the UE, on an SCell and a DAI value is greater than 1 in a detected EPDCCH on a PCell, then the eNB may assume that the UE determines a PUCCH format 3 resource based on at least one of a predefined offset or a separate PUCCH resource and a HARQ-ACK resource offset field in a DCI format of a corresponding EPDCCH assignment with a DAI value greater than 1. If there is only one PDSCH detected, by the UE, with a DAI value of 1, excluding SPS on a PCell, then the eNB may assume that the UE determines a PUCCH format 1a/1b resource based on the number of CCEs.

A method performed by a UE is also described. The method includes decoding an UL/DL reconfiguration DCI with an eIMTA-RNTI on a PDCCH. The method also includes determining if one or more valid UL/DL configurations in the UL/DL reconfiguration DCI with eIMTA-RNTI for all configured eIMTA cells are received. The method further includes determining if PUCCH format 3 is configured. The method additionally includes determining a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource are received. The method also includes sending PDSCH HARQ-ACK information on the selected PUCCH resource in an uplink subframe.

A method performed by an eNB is also described. The method includes transmitting, to a UE, UL/DL reconfiguration DCI with an eIMTA-RNTI on a PDCCH. The method also includes assuming that the UE determines if one or more valid UL/DL configurations in the UL/DL reconfiguration DCI with eIMTA-RNTI for all of the configured eIMTA cells are received. The method further includes assuming that the UE determines if PUCCH format 3 is configured. The method additionally includes assuming that the UE determines a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource is received. The method also includes monitoring potential PUCCH resources and receiving PDSCH HARQ-ACK information on the detected PUCCH resource in an uplink subframe.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe feedback reporting associated with enhanced interference mitigation with traffic adaptation (eIMTA) cells. In particular, the systems and methods disclosed herein describe feedback for UL/DL reconfiguration signaling. The systems and methods disclosed herein also describe fallback operations for UEs that support eIMTA if UL/DL reconfiguration signaling is missed or is not detected correctly. The feedback (e.g., acknowledgement) for UL/DL reconfiguration signaling may ensure the correct understanding between an eNB and a UE. It may also reduce the payload on the PUCCH, and may improve the reliability and performance of PDSCH hybrid automatic repeat request acknowledgement (HARQ-ACK).

It should be noted that eIMTA may also be referred to as dynamic UL/DL reconfiguration. Therefore, a cell that supports eIMTA (e.g., an eIMTA cell) may be referred to as a dynamic UL/DL reconfiguration cell. As used herein, "the UE is configured with eIMTA" may be referred to as "the UE is configured with a serving cell with dynamic subframe type conversion," "the UE is configured with a DL-reference UL/DL configuration of the serving cell," "the UE is configured with a UL-reference UL/DL configuration of the serving cell" or "the UE is configured with a DL-reference UL/DL configuration of the serving cell and a UL-reference UL/DL configuration of the serving cell."

In some configurations, eIMTA may be used in LTE TDD networks to enable more flexible use of spectrum using dynamic UL/DL allocation based on traffic load. Therefore, some subframes may be flexible and convertible (e.g., a flexible subframe) and may be used as either special, downlink or uplink as described below. With eIMTA, explicit PHY layer signaling may be used for UL/DL reconfiguration with a time scale of 10 milliseconds (ms) or less. The systems and methods described herein provide fallback solutions to improve the reliability and robustness of eIMTA.

An eIMTA cell is a TDD cell that supports dynamic UL/DL reconfiguration to adapt the traffic load on the cell. In LTE time-division duplexing (LTE TDD), the same frequency band may be used for both uplink and downlink signals. To achieve different DL and UL allocations (e.g., traffic ratios) in LTE TDD, seven uplink-downlink (UL/DL) configurations are given in 3GPP specifications (e.g., 3GPP TS 36.211). These allocations can allocate between 40% and 90% of subframes to DL signals.

In some implementations, a system information change procedure is used to change the UL/DL configuration. This procedure has a long delay, and requires a cold system restart (e.g., all UEs in a system cannot transmit and receive for a certain period of time in order to disconnect the UL/DL associations of the old configuration and set up new associations). It should be noted that a subframe association may be referred to as a "UL/DL association," which may include UL-to-DL subframe associations and DL-to-UL subframe associations. Examples of associations include association of a DL subframe (PDCCH) to UL power control in a UL subframe, association of a DL subframe physical DL control channel (PDCCH) to physical UL shared channel (PUSCH) allocation in a UL subframe, associations of acknowledgement and negative acknowledgement (ACK/NACK) feedback on UL subframe(s) for physical downlink shared channel (PDSCH) transmissions in DL subframe(s), association of acknowledgement and negative acknowledgement (ACK/NACK) feedback on a physical hybrid automatic repeat request (HARQ) indicator channel (PHICH) or physical downlink control channel (PDCCH) for physical UL shared channel (PUSCH) transmission(s) in UL subframe(s), etc.

Physical (PHY) layer signaling may be extended to enable dynamic DL-to-UL conversion. For example, a special subframe type 2 may be used, which may be viewed as an extension of a standard special subframe that is used for DL-to-UL transition. This special subframe type 2 can be used to provide UL transmissions while maintaining existing UL/DL associations. PHY layer signaling may also include using downlink control information (DCI) 0/4 downlink formats for PUSCH scheduling following the association timings of a UL-reference UL/DL configuration, and using DCI formats 1/2 and extensions for PDSCH scheduling, etc.

As used herein, a "Release 12 UE" may be a UE that may operate in accordance with 3GPP Release 12 specifications and possibly subsequent specifications. A Release 12 UE may be a UE that supports eIMTA. Additionally, as used herein, a "legacy UE" may be a UE that may operate in accordance with earlier (e.g., LTE Releases 8, 9, 10, 11) specifications.

In some implementations, eIMTA may be applied for both DL-to-UL and UL-to-DL reconfiguration or switching. For example, eIMTA allows applying one configuration for PDSCH HARQ-ACK timing and applying another configuration for PUSCH scheduling and PUSCH HARQ-ACK timing. UEs that support eIMTA may follow these timings based on the corresponding reference UL/DL configurations in an allowed UL/DL reconfiguration range (e.g., switching region). Legacy UEs may follow the existing associations without any change or knowledge of the dynamic UL/DL reconfiguration. However, the eNB may restrict the legacy UEs in some subframes to maintain backward compatible timing.

The systems and methods disclosed herein provide approaches for applying PDSCH HARQ-ACK timings for UEs that may operate in accordance with Release 12 specifications (and beyond) based on different DL-reference UL/DL configurations. For legacy UEs, impacts and restrictions of allowing legacy UEs to operate without any modifications to existing timings are also analyzed herein. Based on an allowed UL/DL reconfiguration range, for example, the PDSCH HARQ-ACK timing may be configured differently for UEs that support eIMTA than for legacy UEs. A legacy UE should assume no HARQ-ACK timing change. However, the eNB may schedule legacy UEs to avoid potential conflicts.

For UEs that support and are configured with eIMTA cells, the PDSCH HARQ-ACK timing of an eIMTA cell may be based on one reference UL/DL configuration, while PUSCH scheduling and PUSCH HARQ-ACK timing of an eIMTA cell may be based on another reference UL/DL configuration. For example, the PDSCH HARQ-ACK configuration may follow a first reference UL/DL configuration with a number (e.g., minimum number) of UL subframes in the allowed UL/DL reconfiguration range. The first reference UL/DL configuration may or may not be the same as a default UL/DL configuration.

The PUSCH scheduling and PUSCH HARQ-ACK timing of an eIMTA cell may follow a second reference UL/DL configuration with a number (e.g., maximum number) of UL subframes in the allowed UL/DL reconfiguration range. The second reference UL/DL configuration may or may not be the same as a default UL/DL configuration. For subframes with allowed UL/DL switching (e.g., subframes in one or more convertible regions), systems and methods are provided herein for providing PDSCH HARQ-ACK timing when eIMTA is configured.

A UL/DL reconfiguration may be needed in several cases. For example, a UL/DL reconfiguration may be needed if the allocated UL resource cannot support the UL traffic load. In another example, UL/DL reconfiguration may be needed if the allocated DL resource cannot support the DL traffic load. Furthermore, a UL/DL reconfiguration may be used to adapt to a traffic load with a better matching UL/DL allocation. For instance, a UL/DL reconfiguration may be needed if a current UL/DL configuration does not match the UL-to-DL traffic ratio.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Thus, the following more detailed description of several implementations, as represented in the figures, is not intended to limit scope, as claimed, but is merely representative of the systems and methods.

FIG. 1 is a block diagram illustrating one configuration of one or more eNBs 160 and one or more UEs 102 in which systems and methods for feedback reporting may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, an EPDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UL/DL reconfiguration DCI decoder 128, a UE PUCCH resource module 130 and a UE PDSCH HARQ-ACK module 132.

The UL/DL reconfiguration DCI decoder 128 may decode a UL/DL reconfiguration DCI with an eIMTA-RNTI on a PDCCH/EPDCCH. The UL/DL reconfiguration DCI with an eIMTA-RNTI may be received from an eNB 160. Explicit reconfiguration signaling (e.g., the reconfiguration DCI) may be used to indicate the actual TDD UL/DL configuration. In one implementation, the eIMTA-RNTI may be UE-specifically configured via RRC. Different UEs 102 may be configured with different eIMTA-RNTIs.

In some implementations, an eIMTA TDD cell may support dynamic UL/DL reconfiguration with traffic adaptation. In eIMTA, the PDSCH HARQ-ACK timing may be based on an RRC-configured DL HARQ reference configuration. In fallback mode operation, a UE 102 only monitors the DL and special subframes defined by the system information block type 1 (SIB1) UL/DL configuration. Thus, to avoid ambiguity with the eNB 160, the HARQ-ACK reporting of the monitored subframes may be specified.

Furthermore, if a UE 102 is configured with PUCCH format 3, then the UE 102 may follow a HARQ-ACK fallback operation using PUCCH format 3. But if there is only a semi-persistent scheduling (SPS) transmission, or only one DL subframe detected with a Downlink Assignment Index (DAI) value of 1 in a DL assignment on a cell, the UE 102 may report the HARQ-ACK with PUCCH format 1a/1b instead of PUCCH format 3. As used herein, "DAT" may also be referred to as downlink DAI (DL DAI).

In an eIMTA TDD cell, a UE 102 may be configured with a DL HARQ reference UL/DL configuration by RRC signaling. The PDSCH HARQ-ACK timing may be performed based on the DL HARQ reference UL/DL configuration. Thus, the DL association set according to the DL HARQ reference configuration defines the potential subframes that can carry a PDSCH for the UE 102. On the other hand, some of the subframes in the DL association set may be configured as UL by reconfiguration DCI, which indicate the UL/DL configuration used in a reconfiguration period.

According to the systems and methods described herein, the detection of reconfiguration signaling may be implicitly reported to the eNB 160 by PUCCH channel selection. This may minimize the HARQ-ACK payload.

If a UE 102 is configured with PUCCH format 3, under fallback operation when valid UL/DL configuration in the reconfiguration Downlink Control Information (DCI) is not detected, the actual DL and special subframe allocation is unknown to the UE 102, and the UE 102 monitors only the DL and special subframes specified by the SIB1 configuration. As used herein, "SIB1 configuration" refers to the UL/DL configuration in the SystemInformationBlockType1 or RadioResourceConfigCommon signaling in the case that the eIMTA cell is a PCell and the RadioResourceConfigCommonSCell-r10 in the case that the eIMTA cell is an SCell. However, since some subframes are not monitored, there may be mismatch on the DAI values.

The UL/DL reconfiguration DCI decoder 128 may determine if one or more valid UL/DL configurations in the UL/DL reconfiguration DCI with eIMTA-RNTI for all configured eIMTA cells are received. The status of the reconfiguration DCI with eIMTA-RNTI may be based on whether a valid UL/DL configuration in the reconfiguration DCI with eIMTA-RNTI for a given reconfiguration period is detected (e.g., received) or not.

If there is more than one eIMTA cell configured, for the PUCCH reporting in a given uplink subframe, valid UL/DL configurations in the reconfiguration DCI with eIMTA-RNTI are considered as detected if valid UL/DL configurations in the reconfiguration DCI signals for all eIMTA cells are correctly received (e.g., detected) based on the DL association set of the uplink of each eIMTA cell. Furthermore, valid UL/DL configurations in the reconfiguration DCI with eIMTA-RNTI are considered as not detected if a valid UL/DL configuration in the reconfiguration DCI signal of any eIMTA cell is not received (e.g., detected) based on the DL association set of the uplink of the eIMTA cell.

The UE PUCCH resource module 130 may determine a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource are received. If a UE 102 is configured with PUCCH format 3, under normal operation when valid UL/DL configuration in the reconfiguration DCI is detected (e.g., DCI is received), the DL and special subframes according to the UL/DL configuration in the reconfiguration DCI may be used for HARQ-ACK reports to minimize the HARQ-ACK bits on a PUCCH or PUSCH feedback.

The PUCCH format 3 resource may be configured by higher layer signaling and may be indicated by the Transmitter Power Control (TPC) field if the PDSCH is scheduled by a PDCCH on a PCell or an PDCCH/EPDCCH on a SCell. The PUCCH format 3 resource may be configured by higher layer signaling and indicated by the HARQ-ACK resource offset (e.g., acknowledgment resource offset (ARO)) bits if the PDSCH is scheduled by an EPDCCH on the PCell. This may be accomplished as described in connection with FIG. 7.

If valid UL/DL configurations in the UL/DL reconfiguration DCI with eIMTA-RNTI of all configured eIMTA cells corresponding to a subframe for the PUCCH resource are detected, then the UE PUCCH resource module 130 may select the PUCCH resource based on at least one of a Transmitter Power Control (TPC) field (e.g., an acknowledgment resource indicator (ARI)) or an acknowledgment resource offset (ARO) in a DL scheduling DCI. The Transmitter Power Control (TPC) field may be included in a DL grant.

In one case, if a PDSCH is detected on an SCell in a DL assignment by PDCCH/EPDCCH, or a DAI value is greater than 1 in a detected PDCCH on a PCell, then the UE PUCCH resource module 130 may determine a PUCCH format 3 resource based on the TPC field in a PDCCH/EPDCCH assignment with a DAI value greater than 1. In another case, if there is no PDSCH detected on an SCell and a DAI value is greater than 1 in a detected EPDCCH on a PCell, then the UE PUCCH resource module 130 may determine a PUCCH format 3 resource based on a HARQ-ACK resource offset field in a DCI format of a corresponding EPDCCH assignment with a DAI value greater than 1.

In yet another case, if there is only one PDSCH detected with a DAI value of 1, excluding SPS on a PCell, then the UE PUCCH resource module 130 may determine a PUCCH format 1a/1b resource based on the number of control channel elements (CCEs). In this case, a HARQ-ACK fallback mode may be used if there is only one PDSCH with a DAI value of 1 in a DL assignment is detected on the PCell. The UE PUCCH resource module 130 may follow the number of CCEs.

If at least one valid UL/DL configuration in the UL/DL reconfiguration DCI with eIMTA-RNTI for at least one configured eIMTA cell corresponding to a subframe for the PUCCH resource is not received, then the UE PUCCH resource module 130 may select the PUCCH resource based on at least one of a predefined offset or a separate PUCCH resource. To indicate the misdetection of reconfiguration DCI, a different PUCCH resource can be used for the HARQ-ACK reporting. The PUCCH resource can be determined by the PUCCH resource for normal operation with an extra offset value. The offset value can be fixed or predefined (e.g., 1). The offset value can be signaled by higher layer (e.g., RRC configuration).

In one case, if a PDSCH is detected on an SCell in a DL assignment by PDCCH/EPDCCH, or a DAI value is greater than 1 in a detected PDCCH on a PCell, then the UE PUCCH resource module 130 may determine a PUCCH format 3 resource based on a predefined offset or a separate PUCCH resource and a TPC field in a PDCCH/EPDCCH assignment with a DAI value greater than 1. In another case, if there is no PDSCH detected on an SCell and a DAI value is greater than 1 in a detected EPDCCH on a PCell, then the UE PUCCH resource module 130 may determine a PUCCH format 3 resource based on at least one of a predefined offset or a separate PUCCH resource and a HARQ-ACK resource offset field in a DCI format of a corresponding EPDCCH assignment with a DAI value greater than 1.

In yet another case, if only one PDSCH with a DAI equal to 1 is detected on the PCell, the HARQ-ACK reporting may be performed on PUCCH format 1a/1b, instead of PUCCH format 3 with an extra offset value. In one implementation, if there is only one PDSCH detected with a DAI value of 1, excluding SPS on a PCell, then the UE PUCCH resource module 130 may determine a PUCCH format 1a/1b resource based on the number of CCEs.

The UE PDSCH HARQ-ACK module 132 may send PDSCH HARQ-ACK information on the selected PUCCH resource in an uplink subframe. The PDSCH HARQ-ACK information may be determined in different ways. In one case, if PUCCH format 3 is configured and valid UL/DL configurations in the UL/DL reconfiguration DCI with eIMTA-RNTI for all of the configured eIMTA cells corresponding to a subframe for the PUCCH resource are received, then the UE PDSCH HARQ-ACK module 132 may determine the PDSCH HARQ-ACK information based on at least one of a DL subframe and a special subframe according to the UL/DL configuration in the UL/DL reconfiguration DCI in a DL association set for a given UL subframe of each configured eIMTA cell.

However, if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received, the UE PDSCH HARQ-ACK module 132 may report only the HARQ-ACK bits of the fixed DL and special subframes specified by the SIB1 configuration on PUCCH format 3. Therefore, the UE PDSCH HARQ-ACK module 132 may determine the PDSCH HARQ-ACK information based on at least one of a DL subframe and a special subframe according to a system information block type 1 (SIB1) configuration in a DL association set according to a DL HARQ reference configuration for a given UL subframe of each configured eIMTA cell. When a configured eIMTA cell is a PCell, the SIB1 configuration may include a UL/DL configuration in the SIB1 signaling or RadioResourceConfigCommon signaling. When a configured eIMTA cell is an SCell, the SIB1 configuration may include a UL/DL configuration in RadioResourceConfigCommonSCell-r10 signaling.

In another alternative, the UE PDSCH HARQ-ACK module 132 may report the HARQ-ACK bits based on the DL and special subframes specified by the DL HARQ reference configuration on PUCCH format 3. Therefore, if PUCCH format 3 is configured and a valid UL/DL configuration in the UL/DL reconfiguration DCI with eIMTA-RNTI for at least one configured eIMTA cell corresponding to a subframe for the PUCCH resource is not received, then the UE PDSCH HARQ-ACK module 132 may determine the PDSCH HARQ-ACK information based on a DL association set according to a DL HARQ reference configuration for a given UL subframe of each configured eIMTA cell.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on the UL/DL reconfiguration DCI. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a UL/DL reconfiguration DCI encoder 196, an eNB PUCCH resource module 198 and an eNB PDSCH HARQ-ACK module 107.

The UL/DL reconfiguration DCI encoder 196 may encode and transmit a UL/DL reconfiguration DCI with an eIMTA-RNTI on a PDCCH/EPDCCH. The UL/DL reconfiguration DCI with an eIMTA-RNTI may be sent to a UE 102. Explicit reconfiguration signaling (e.g., the reconfiguration DCI) may be used to indicate the actual TDD UL/DL configuration. The eIMTA-RNTI may be UE-specifically configured via RRC. Different UEs 102 may be configured with different eIMTA-RNTIs.

The eNB 160 may be informed of a misdetection of reconfiguration DCI by the UE 102 through different PUCCH resources that are used for the HARQ-ACK reporting. The eNB PUCCH resource module 198 may assume that the UE 102 determines a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource are received. If valid UL/DL configurations in the UL/DL reconfiguration DCI with eIMTA-RNTI of all configured eIMTA cells corresponding to a subframe for the PUCCH resource are detected, then the UE 102 may select the PUCCH resource based on at least one of a TPC field (i.e., an ARI) or an ARO in a DL scheduling DCI.

In one case, if the UE 102 detects a PDSCH on an SCell in a DL assignment by PDCCH/EPDCCH, or a DAI value is greater than 1 in a detected PDCCH on a PCell, then the eNB PUCCH resource module 198 may assume that the UE 102 determines a PUCCH format 3 resource based on a TPC field in a PDCCH/EPDCCH assignment with a DAI value greater than 1. In another case, if the UE 102 does not detect a PDSCH on an SCell and a DAI value is greater than 1 in a detected EPDCCH on a PCell, then the eNB PUCCH resource module 198 may assume that the UE 102 determines a PUCCH format 3 resource based on a HARQ-ACK resource offset field in a DCI format of a corresponding EPDCCH assignment with a DAI value greater than 1.

In yet another case, if the UE 102 detects only one PDSCH with a DAI value of 1, excluding SPS on a PCell, then the eNB PUCCH resource module 198 may assume that the UE 102 determines a PUCCH format 1a/1b resource based on the number of CCEs.

If the UE 102 does not receive at least one valid UL/DL configuration in the UL/DL reconfiguration DCI with eIMTA-RNTI for at least one configured eIMTA cell corresponding to a subframe for the PUCCH resource, then the eNB PUCCH resource module 198 may assume that the UE 102 selects the PUCCH resource based on at least one of a predefined offset or a separate PUCCH resource. During fallback operation, the PUCCH resource can be determined based on an extra offset value. The offset value can be fixed or predefined (e.g., 1). The offset value can be signaled by higher layer signaling (e.g., RRC configuration).

In one case, if the UE 102 detects a PDSCH on an SCell in a DL assignment by PDCCH/EPDCCH, or a DAI value is greater than 1 in a detected PDCCH on a PCell, then the eNB PUCCH resource module 198 may assume that the UE 102 determines a PUCCH format 3 resource based on a predefined offset or a separate PUCCH resource and a TPC field in a PDCCH/EPDCCH assignment with a DAI value greater than 1. In another case, if the UE 102 does not detect a PDSCH on an SCell and a DAI value is greater than 1 in a detected EPDCCH on a PCell, then the eNB PUCCH resource module 198 may assume that the UE 102 determines a PUCCH format 3 resource based on at least one of a predefined offset or a separate PUCCH resource and a HARQ-ACK resource offset field in a DCI format of a corresponding EPDCCH assignment with a DAI value greater than 1.

In yet another case, if the UE 102 detects only one PDSCH with a DAI equal to 1 on the PCell, the HARQ-ACK reporting may be performed on PUCCH format 1a/1b, instead of PUCCH format 3 with an extra offset value.

The eNB PDSCH HARQ-ACK module 107 may receive PDSCH HARQ-ACK information on the selected PUCCH resource in an uplink subframe. The PDSCH HARQ-ACK information may be determined in different ways. In one case, if PUCCH format 3 is configured and valid UL/DL configurations in the UL/DL reconfiguration DCI with eIMTA-RNTI for all of the configured eIMTA cells corresponding to a subframe for the PUCCH resource are received by the UE 102, then the eNB PDSCH HARQ-ACK module 107 may assume that the UE 102 determines the PDSCH HARQ-ACK information based on at least one of a DL subframe and a special subframe according to the UL/DL configuration in the UL/DL reconfiguration DCI in a DL association set for a given UL subframe of each configured eIMTA cell.

However, if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received by the UE 102, the eNB PDSCH HARQ-ACK module 107 may assume that the UE 102 determines the PDSCH HARQ-ACK information based on at least one of a DL subframe and a special subframe according to an SIB1 configuration in a DL association set according to a DL HARQ reference configuration for a given UL subframe of each configured eIMTA cell.

In another alternative, if PUCCH format 3 is configured and a valid UL/DL configuration in the UL/DL reconfiguration DCI with eIMTA-RNTI for at least one configured eIMTA cell corresponding to a subframe for the PUCCH resource is not received by the UE 102, then the eNB PDSCH HARQ-ACK module 107 may assume that the UE 102 determines the PDSCH HARQ-ACK information based on a DL association set according to a DL HARQ reference configuration for a given UL subframe of each configured eIMTA cell.

The eNB operations module 182 may provide information 190 to the one or more receivers 178. For example, the eNB operations module 182 may inform the receiver(s) 178 when or when not to receive transmissions from the UE(s) 102.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the UL/DL reconfiguration DCI. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
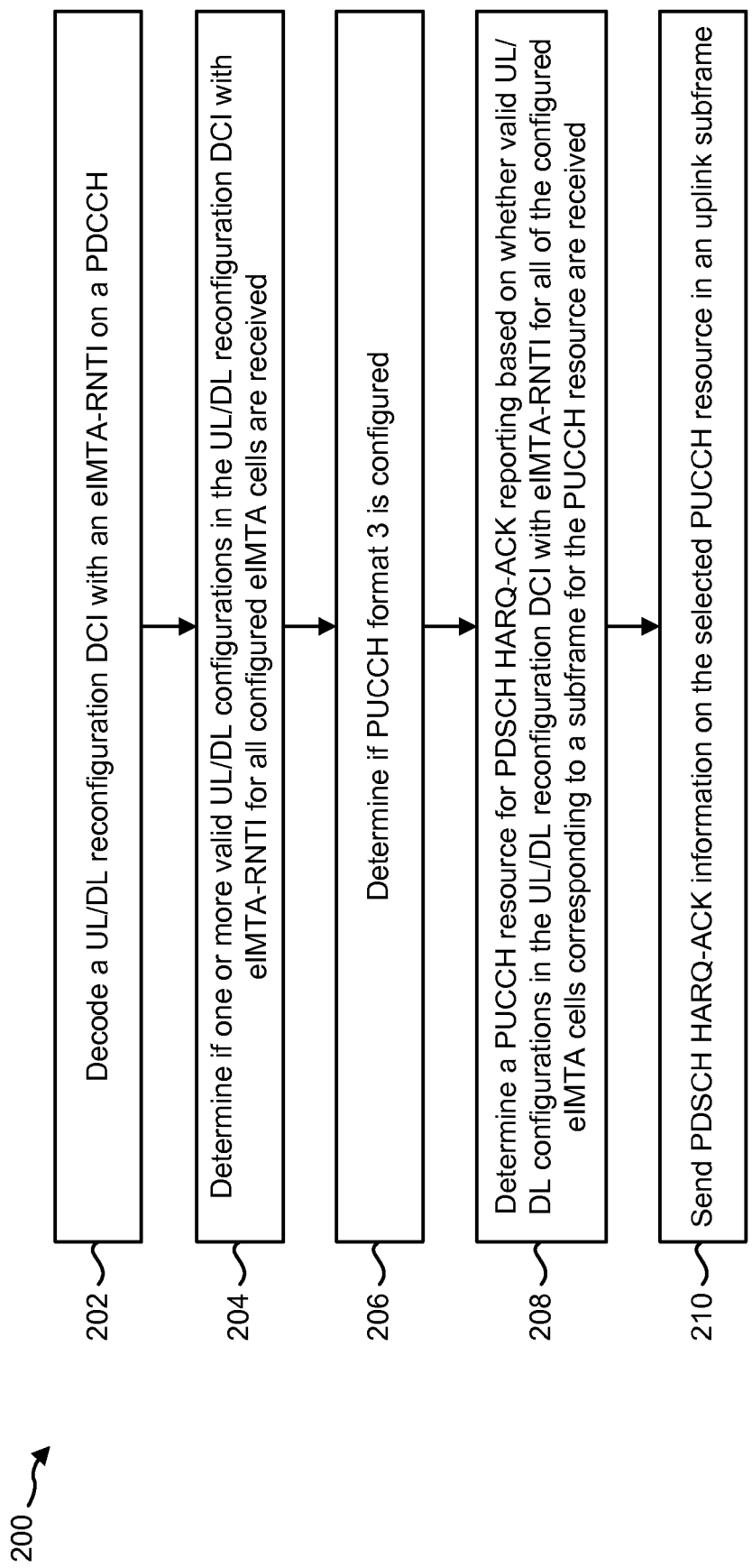
FIG. 2 is a flow diagram illustrating one implementation of a method for feedback reporting by a UE.

FIG. 2 is a flow diagram illustrating one implementation of a method 200 for feedback reporting by a UE 102. The UE 102 may be configured with eIMTA support. The UE 102 may decode 202 a UL/DL reconfiguration DCI with an eIMTA-RNTI on a PDCCH/EPDCCH. The UL/DL reconfiguration DCI with an eIMTA-RNTI may be received from an eNB 160. Explicit reconfiguration signaling (e.g., the reconfiguration DCI) may be used to indicate the actual TDD UL/DL configuration. The eIMTA-RNTI may be UE-specifically configured via RRC. Different UEs 102 may be configured with different eIMTA-RNTIs.

The UE 102 may determine 204 if one or more valid UL/DL configurations in the UL/DL reconfiguration DCI with eIMTA-RNTI for all configured eIMTA cells are received. The status of the reconfiguration DCI with eIMTA-RNTI may be based on whether a valid UL/DL configuration in the reconfiguration DCI with eIMTA-RNTI for a given reconfiguration period is detected (e.g., received) or not.

If there is more than one eIMTA cell configured, for the PUCCH reporting in a given uplink subframe, valid UL/DL configurations in the reconfiguration DCI with eIMTA-RNTI are considered as detected if valid UL/DL configurations in the reconfiguration DCI signals for all eIMTA cells are correctly received (e.g., detected) based on the DL association set of the uplink of each eIMTA cell. Furthermore, valid UL/DL configurations in the reconfiguration DCI with eIMTA-RNTI are considered as not detected if a valid UL/DL configuration in the reconfiguration DCI signal of any eIMTA cell is not received (e.g., detected) based on the DL association set of the uplink of the eIMTA cell.

The UE 102 may determine 206 if PUCCH format 3 is configured. The PUCCH format 3 resource may be configured by higher layer signaling and may be indicated by the TPC field if the PDSCH is scheduled by a PDCCH on a PCell or an PDCCH/EPDCCH on a SCell. The PUCCH format 3 resource may be configured by higher layer signaling and indicated by the HARQ-ACK resource offset (e.g., ARO) bits if the PDSCH is scheduled by an EPDCCH on the PCell. This may be accomplished as described in connection with FIG. 7.

The UE 102 may determine 208 a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource are received. If a UE 102 is configured with PUCCH format 3, under normal operation when valid UL/DL configuration in the reconfiguration DCI is detected (e.g., DCI is received), the DL and special subframes according to the UL/DL configuration in the reconfiguration DCI should be used for HARQ-ACK reports to minimize the HARQ-ACK bits on a PUCCH or PUSCH feedback.

If valid UL/DL configurations in the UL/DL reconfiguration DCI with eIMTA-RNTI of all configured eIMTA cells corresponding to a subframe for the PUCCH resource are detected, then the UE 102 may select the PUCCH resource based on at least one of a TPC field (i.e., an ARI) or an ARO in a DL scheduling DCI.

In one case, if a PDSCH is detected on an SCell in a DL assignment by PDCCH/EPDCCH, or a DAI value is greater than 1 in a detected PDCCH on a PCell, then the UE 102 may determine 208 a PUCCH format 3 resource based on a TPC field in a PDCCH/EPDCCH assignment with a DAI value greater than 1. In another case, if there is no PDSCH detected on an SCell and a DAI value is greater than 1 in a detected EPDCCH on a PCell, then the UE 102 may determine 208 a PUCCH format 3 resource based on a HARQ-ACK resource offset field in a DCI format of a corresponding EPDCCH assignment with a DAI value greater than 1.

In yet another case, if there is only one PDSCH detected with a DAI value of 1, excluding SPS on a PCell, then the UE 102 may determine 208 a PUCCH format 1a/1b resource based on the number of CCEs. In this case, a HARQ-ACK fallback mode may be used if there is only one PDSCH with a DAI value of 1 in a DL assignment that is detected on the PCell. The UE 102 may follow the number of CCEs.

If the UE 102 determines 204 that at least one valid UL/DL configuration in the UL/DL reconfiguration DCI with eIMTA-RNTI for at least one configured eIMTA cell corresponding to a subframe for the PUCCH resource is not received, then the UE 102 may select the PUCCH resource based on at least one of a predefined offset or a separate PUCCH resource. To indicate the misdetection of reconfiguration DCI, a different PUCCH resource can be used for the HARQ-ACK reporting. The PUCCH resource can be determined by the PUCCH resource for normal operation with an extra offset value. The offset value can be fixed or predefined (e.g., 1). The offset value can be signaled by higher layer (e.g., RRC configuration).

In one case, if a PDSCH is detected on an SCell in a DL assignment by PDCCH/EPDCCH, or a DAI value is greater than 1 in a detected PDCCH on a PCell, then the UE 102 may determine 208 a PUCCH format 3 resource based on a predefined offset or a separate PUCCH resource and a TPC field in a PDCCH/EPDCCH assignment with a DAI value greater than 1. In another case, if there is no PDSCH detected on an SCell and a DAI value is greater than 1 in a detected EPDCCH on a PCell, then the UE 102 may determine 208 a PUCCH format 3 resource based on at least one of a predefined offset or a separate PUCCH resource and a HARQ-ACK resource offset field in a DCI format of a corresponding EPDCCH assignment with a DAI value greater than 1.

In yet another case, if only one PDSCH with a DAI equal to 1 is detected on the PCell, the HARQ-ACK reporting may be performed on PUCCH format 1a/1b, instead of PUCCH format 3 with an extra offset value. In one implementation, if there is only one PDSCH detected with a DAI value of 1, excluding SPS on a PCell, then the UE 102 may determine 208 a PUCCH format 1a/1b resource based on the number of CCEs.

The UE 102 may send 210 PDSCH HARQ-ACK information on the selected PUCCH resource in an uplink subframe. In one case, if PUCCH format 3 is configured and valid UL/DL configurations in the UL/DL reconfiguration DCI with eIMTA-RNTI for all of the configured eIMTA cells corresponding to a subframe for the PUCCH resource are received, then the UE 102 may determine the PDSCH HARQ-ACK information based on at least one of a DL subframe and a special subframe according to the UL/DL configuration in the UL/DL reconfiguration DCI in a DL association set for a given UL subframe of each configured eIMTA cell.

However, if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received, the UE 102 may report only the HARQ-ACK bits of the fixed DL and special subframes specified by the SIB1 configuration on PUCCH format 3. Therefore, the UE 102 may determine the PDSCH HARQ-ACK information based on at least one of a DL subframe and a special subframe according to an SIB1 configuration in a DL association set according to a DL HARQ reference configuration for a given UL subframe of each configured eIMTA cell. When a configured eIMTA cell is a PCell, the SIB1 configuration may include a UL/DL configuration in the SIB1 signaling or RadioResourceConfigCommon signaling. When a configured eIMTA cell is an SCell, the SIB1 configuration may include a UL/DL configuration in RadioResourceConfigCommonSCell-r10 signaling.

In another alternative, the UE 102 may report the HARQ-ACK bits based on the DL and special subframes specified by the DL HARQ reference configuration on PUCCH format 3. Therefore, if PUCCH format 3 is configured and a valid UL/DL configuration in the UL/DL reconfiguration DCI with eIMTA-RNTI for at least one configured eIMTA cell corresponding to a subframe for the PUCCH resource is not received, then the UE 102 may determine the PDSCH HARQ-ACK information based on a DL association set according to a DL HARQ reference configuration for a given UL subframe of each configured eIMTA cell.

Figure 3:
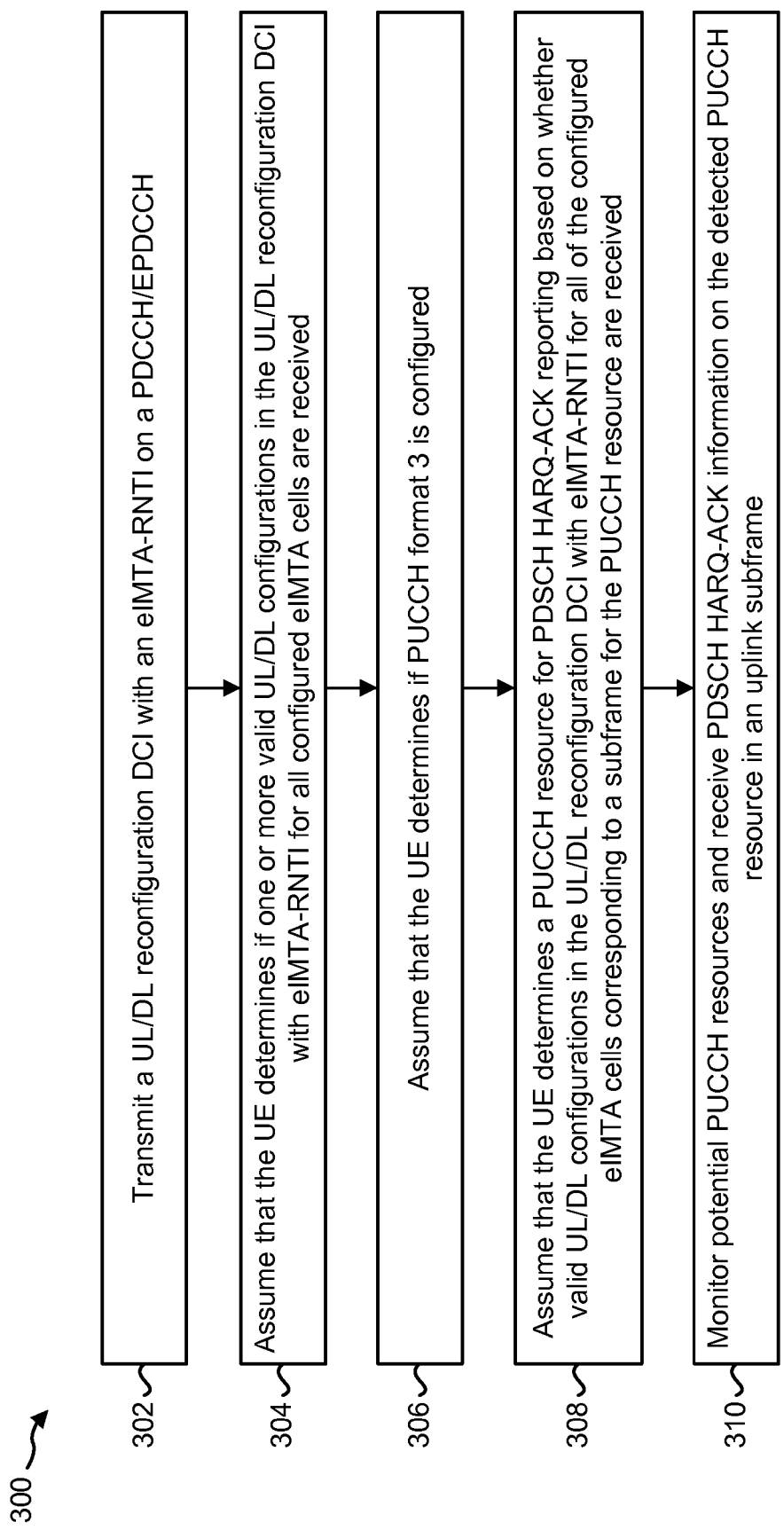
FIG. 3 is a flow diagram illustrating one implementation of a method for feedback reporting by an eNB.

FIG. 3 is a flow diagram illustrating one implementation of a method 300 for feedback reporting by an eNB 160. The eNB 160 may be configured with eIMTA support. The eNB 160 may transmit 302 a UL/DL reconfiguration DCI with an eIMTA-RNTI on a PDCCH/EPDCCH. The UL/DL reconfiguration DCI with an eIMTA-RNTI may be sent to a UE 102. Explicit reconfiguration signaling (e.g., the reconfiguration DCI) may be used to indicate the actual TDD UL/DL configuration. The eIMTA-RNTI may be UE-specifically configured via RRC. Different UEs 102 may be configured with different eIMTA-RNTIs.

According to the systems and methods described herein, the detection of reconfiguration signaling may be implicitly reported to the eNB 160 by PUCCH channel selection. This may minimize the HARQ-ACK payload in all cases.

The eNB 160 may assume 304 that the UE 102 determines if one or more valid UL/DL configurations in the UL/DL reconfiguration DCI with eIMTA-RNTI for all configured eIMTA cells are received. The status of the reconfiguration DCI with eIMTA-RNTI may be based on whether a valid UL/DL configuration in the reconfiguration DCI with eIMTA-RNTI for a given reconfiguration period is detected (e.g., received) or not.

The eNB 160 may assume 306 that the UE 102 determines if physical uplink control channel (PUCCH) format 3 is configured. This may be accomplished as described in connection with FIG. 7.

The eNB 160 may assume 308 that the UE 102 determines a PUCCH resource for PDSCH HARQ-ACK reporting based on whether valid UL/DL configurations in the UL/DL reconfiguration DCI with eIMTA-RNTI for all of the configured eIMTA cells corresponding to a subframe for the PUCCH resource are received. If valid UL/DL configurations in the UL/DL reconfiguration DCI with eIMTA-RNTI of all configured eIMTA cells corresponding to a subframe for the PUCCH resource are detected, then the UE 102 may select the PUCCH resource based on at least one of a TPC field (i.e., an ARI) or an ARO in a DL scheduling DCI.

In one case, if the UE 102 detects a PDSCH on an SCell in a DL assignment by PDCCH/EPDCCH, or a DAI value is greater than 1 in a detected PDCCH on a PCell, then the eNB 160 may assume 308 that the UE 102 determines a PUCCH format 3 resource based on a transmitter power control (TPC) field in a PDCCH/EPDCCH assignment with a DAI value greater than 1. In another case, if the UE 102 does not detect a PDSCH on an SCell and a DAI value is greater than 1 in a detected EPDCCH on a PCell, then the eNB 160 may assume 308 that the UE 102 determines a PUCCH format 3 resource based on a HARQ-ACK resource offset field in a DCI format of a corresponding EPDCCH assignment with a DAI value greater than 1.

In yet another case, if the UE 102 detects only one PDSCH with a DAI value of 1, excluding SPS on a PCell, then the eNB 160 may assume 308 that the UE 102 determines a PUCCH format 1a/1b resource based on the number of CCEs.

If the UE 102 does not receive at least one valid UL/DL configuration in the UL/DL reconfiguration DCI with eIMTA-RNTI for at least one configured eIMTA cell corresponding to a subframe for the PUCCH resource, then the eNB 160 may assume 308 that the UE 102 selects the PUCCH resource based on at least one of a predefined offset or a separate PUCCH resource. The eNB 160 may be informed of a misdetection of reconfiguration DCI by the UE 102 through different PUCCH resources that may be used for the HARQ-ACK reporting. During fallback operation, the PUCCH resource can be determined based on an extra offset value. The offset value can be fixed or predefined (e.g., 1). The offset value can be signaled by higher layer (e.g., RRC configuration).

In one case, if the UE 102 detects a PDSCH on an SCell in a DL assignment by PDCCH/EPDCCH, or a DAI value is greater than 1 in a detected PDCCH on a PCell, then the eNB 160 may assume 308 that the UE 102 determines a PUCCH format 3 resource based on a predefined offset or a separate PUCCH resource and a TPC field in a PDCCH/EPDCCH assignment with a DAI value greater than 1. In another case, if the UE 102 does not detect a PDSCH on an SCell and a DAI value is greater than 1 in a detected EPDCCH on a PCell, then the eNB 160 may assume 308 that the UE 102 determines a PUCCH format 3 resource based on at least one of a pre-defined offset or a separate PUCCH resource and a HARQ-ACK resource offset field in a DCI format of a corresponding EPDCCH assignment with a DAI value greater than 1.

In yet another case, if the UE 102 detects only one PDSCH with a DAI equal to 1 on the PCell, the HARQ-ACK reporting may be performed on PUCCH format 1a/1b, instead of PUCCH format 3 with an extra offset value.

The eNB 160 may monitor 310 potential PUCCH resources and receive PDSCH HARQ-ACK information on the detected PUCCH resource in an uplink subframe. In some implementations, the eNB 160 may monitor all possible PUCCH reporting cases. For example, the eNB 160 may monitor 310 the PUCCH resource when the reconfiguration is detected by the UE 102. The eNB 160 may also monitor 310 the PUCCH resource when the reconfiguration is not detected by the UE 102. The eNB 160 may further monitor 310 the PUCCH format 1a/1b resource for a PCell DL subframe with a DAI=1 (for HARQ-ACK fallback reporting on PUCCH format 1a/1b instead of PUCCH format 3).

In one case, if PUCCH format 3 is configured and valid UL/DL configurations in the UL/DL reconfiguration DCI with eIMTA-RNTI for all of the configured eIMTA cells corresponding to a subframe for the PUCCH resource are received by the UE 102, then the eNB 160 may assume that the UE 102 determines the PDSCH HARQ-ACK information based on at least one of a DL subframe and a special subframe according to the UL/DL configuration in the UL/DL reconfiguration DCI in a DL association set for a given UL subframe of each configured eIMTA cell.

However, if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received by the UE 102, the eNB 160 may assume that the UE 102 determines the PDSCH HARQ-ACK information based on at least one of a DL subframe and a special subframe according to an SIB1 configuration in a DL association set according to a DL HARQ reference configuration for a given UL subframe of each configured eIMTA cell.

In another alternative, if PUCCH format 3 is configured and a valid UL/DL configuration in the UL/DL reconfiguration DCI with eIMTA-RNTI for at least one configured eIMTA cell corresponding to a subframe for the PUCCH resource is not received by the UE 102, then the eNB 160 may assume that the UE 102 determines the PDSCH HARQ-ACK information based on a DL association set according to a DL HARQ reference configuration for a given UL subframe of each configured eIMTA cell.

Figure 4:
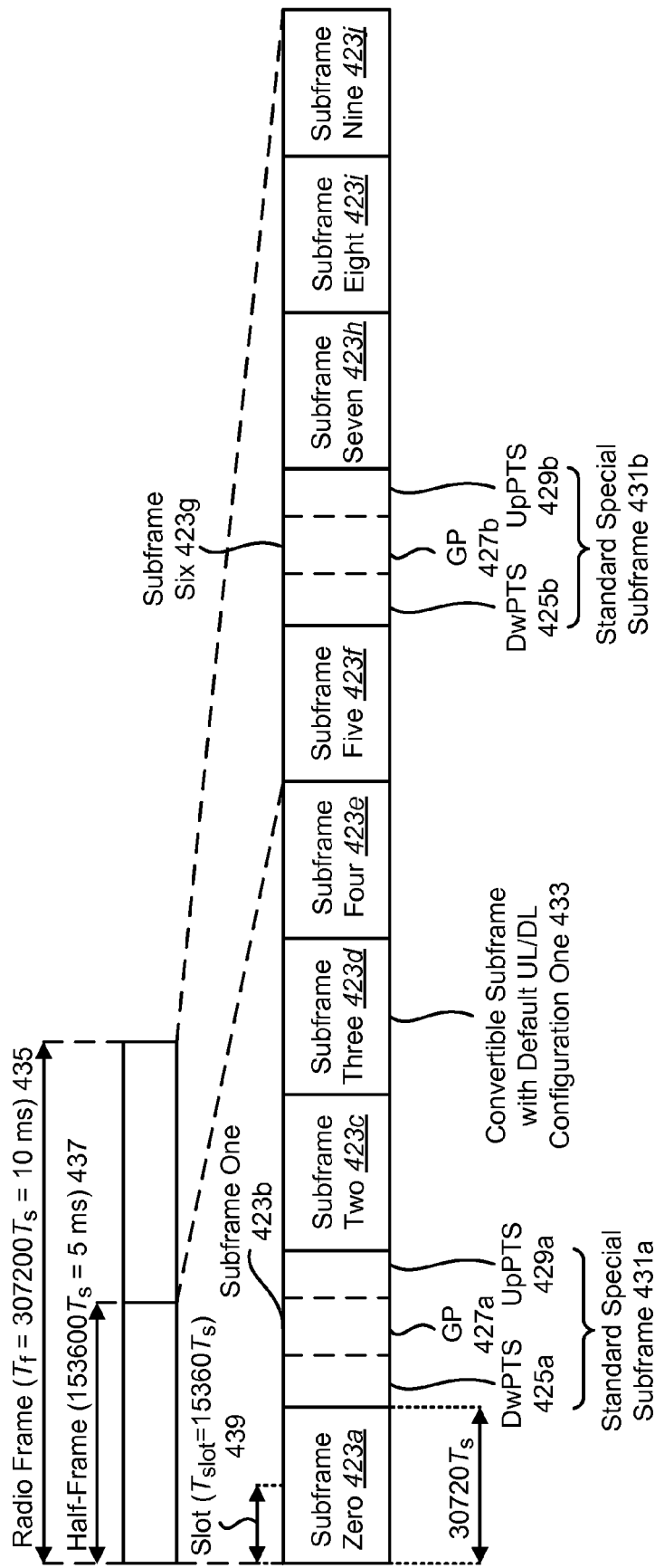
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f=307200 \cdot T_s=10$ ms, where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s=5$ ms. Each half-frame 437 may include five subframes 423a-e, 423f-j each having a length of $30720 \cdot T_s=1$ ms.

TDD UL/DL configurations 0-6 are given below in Table (1) (from Table 4.2-2 in 3GPP TS 36.211). UL/DL configurations with both 5 ms and 10 ms downlink-to-uplink switch-point periodicity may be supported. In particular, seven UL/DL configurations are specified in 3GPP specifications, as shown in Table (1) below. In Table (1), "D" denotes a downlink subframe, "S" denotes a special subframe and "U" denotes a UL subframe.

TABLE (1)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s=1$ ms. Table (2) illustrates several configurations of (standard) special subframes. Each subframe i is defined as two slots, 2i and 2i+1 of length $T_{slot}=15360 \cdot T_s=0.5$ ms in each subframe. In Table (2), "cyclic prefix" is abbreviated as "CP" and "configuration" is abbreviated as "Config" for convenience.

TABLE (2)

| | | Normal CP in downlink | | | Extended CP in downlink | | |
|---|---|---|---|---|---|---|---|
| | | | UpPTS | | | UpPTS | |
| Special Subframe Config | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE (2)-continued

| | | Normal CP in downlink | | | Extended CP in downlink | |
|---|---|---|---|---|---|---|
| Special | | UpPTS | | | UpPTS | |
| Subframe Config | DwPTS | Normal CP in uplink | Extended CP in uplink | DwPTS | Normal CP in uplink | Extended CP in uplink |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames 437. In the case of 10 ms downlink-to-uplink switch-point periodicity, the special subframe exists in the first half-frame 437 only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (2) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot 439.

UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431a-b. In the case of 10 ms downlink-to-uplink switch-point periodicity, a special subframe 431 may exist in the first half-frame 437 only.

Subframe zero (e.g., 0) 423a and subframe five (e.g., 5) 423f and DwPTS 425a-b may be reserved for DL transmission. The UpPTS 429a-b and the subframe(s) immediately following the standard special subframe(s) 431a-b (e.g., subframe two 423c and subframe seven 423h) may be reserved for UL transmission. In one implementation, in a case where multiple cells are aggregated, a UE 102 may assume the same UL/DL configuration across all the cells and that the guard period (GP) of the special subframe(s) in the different cells have an overlap of at least $1456 \cdot T_s$.

One or more of the subframes 423 illustrated in FIG. 4 may be convertible, depending on the UL/DL reconfiguration range. Assuming a default UL/DL configuration 1 as given in Table (1) above, for example, subframe three (e.g., 3) 423d may be a convertible subframe 433 (from UL-to-DL, for instance).

Figure 5:
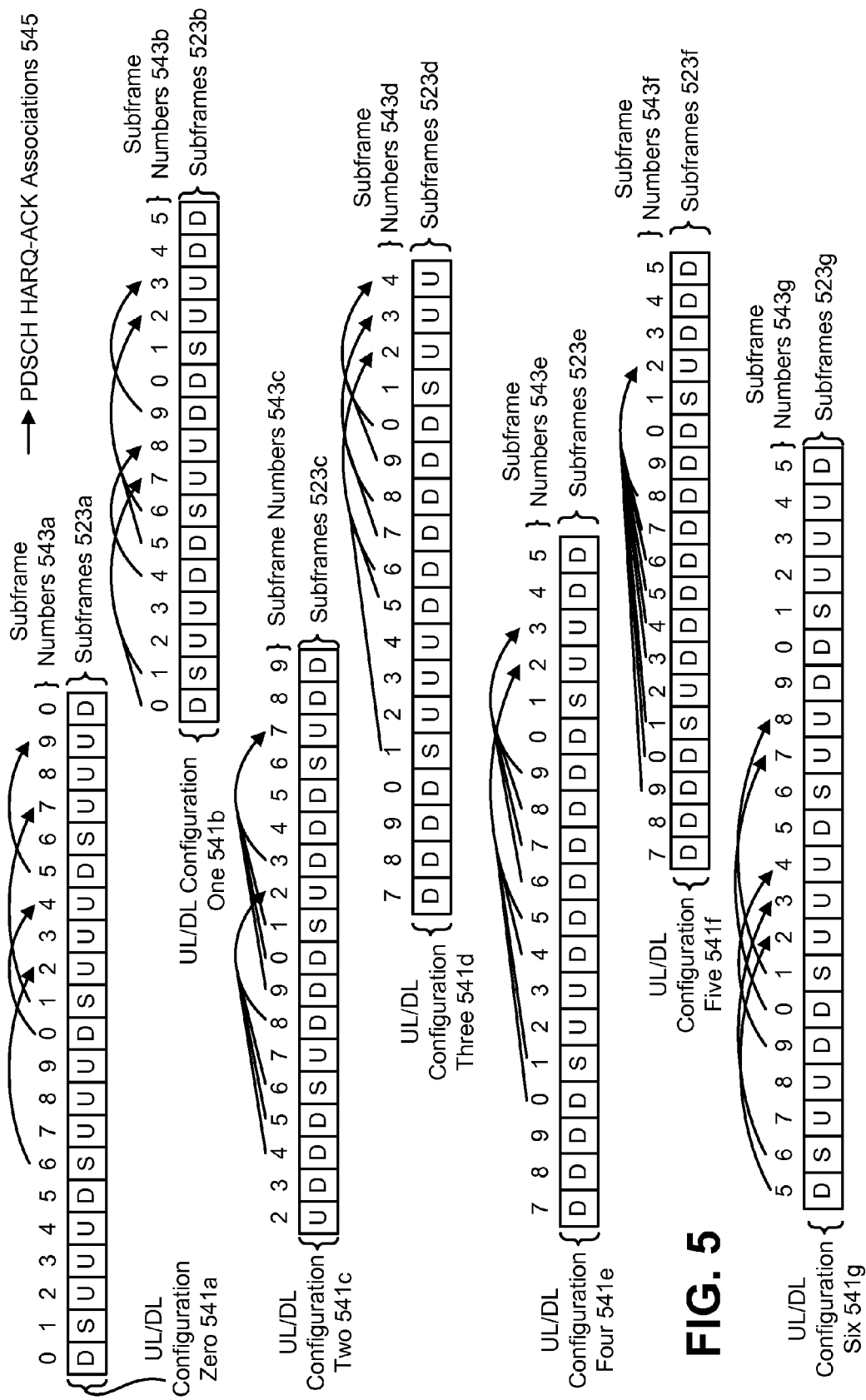
FIG. 5 is a diagram illustrating time-division duplexing (TDD) uplink/downlink (UL/DL) configurations in accordance with the systems and methods described herein.

FIG. 5 is a diagram illustrating TDD UL/DL configurations 541a-g in accordance with the systems and methods described herein. In particular, FIG. 5 illustrates UL/DL configuration zero 541a (e.g., "UL/DL configuration 0") with subframes 523a and subframe numbers 543a, UL/DL configuration one 541b (e.g., "UL/DL configuration 1") with subframes 523b and subframe numbers 543b, UL/DL configuration two 541c (e.g., "UL/DL configuration 2") with subframes 523c and subframe numbers 543c and UL/DL configuration three 541d (e.g., "UL/DL configuration 3") with subframes 523d and subframe numbers 543d. FIG. 5 also illustrates UL/DL configuration four 541e (e.g., "UL/DL configuration 4") with subframes 523e and subframe numbers 543e, UL/DL configuration five 541f (e.g., "UL/DL configuration 5") with subframes 523f and subframe numbers 543f and UL/DL configuration six 541g (e.g., "UL/DL configuration 6") with subframes 523g and subframe numbers 543g.

Furthermore, FIG. 5 illustrates PDSCH HARQ-ACK associations 545 (e.g., PDSCH HARQ-ACK feedback on PUCCH or PUSCH associations). The PDSCH HARQ-ACK associations 545 may indicate HARQ-ACK reporting subframes corresponding to subframes for PDSCH transmissions (e.g., subframes in which PDSCH transmissions may be sent and/or received). The PDSCH HARQ-ACK associations 545 may indicate the association sets and timing for the transmission of PDSCH HARQ-ACK information. It should be noted that some of the radio frames illustrated in FIG. 5 have been truncated for convenience.

The systems and methods described herein may be applied to one or more of the UL/DL configurations 541a-g illustrated in FIG. 5. For example, one or more PDSCH HARQ-ACK associations 545 corresponding to one of the UL/DL configurations 541a-g illustrated in FIG. 5 may be applied to communications between a UE 102 and eNB 160. For example, a DL-reference UL/DL configuration 541 may be determined (e.g., assigned to, applied to) for a serving cell. In this case, PDSCH HARQ-ACK associations 545 may specify PDSCH HARQ-ACK timing (e.g., a HARQ-ACK reporting subframe) for HARQ-ACK feedback transmissions corresponding to the serving cell.

A PDSCH HARQ-ACK association 545 may specify a particular (PDSCH HARQ-ACK) timing for receiving HARQ-ACK information corresponding to a PDSCH. A PDSCH HARQ-ACK association 545 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

Figure 6:
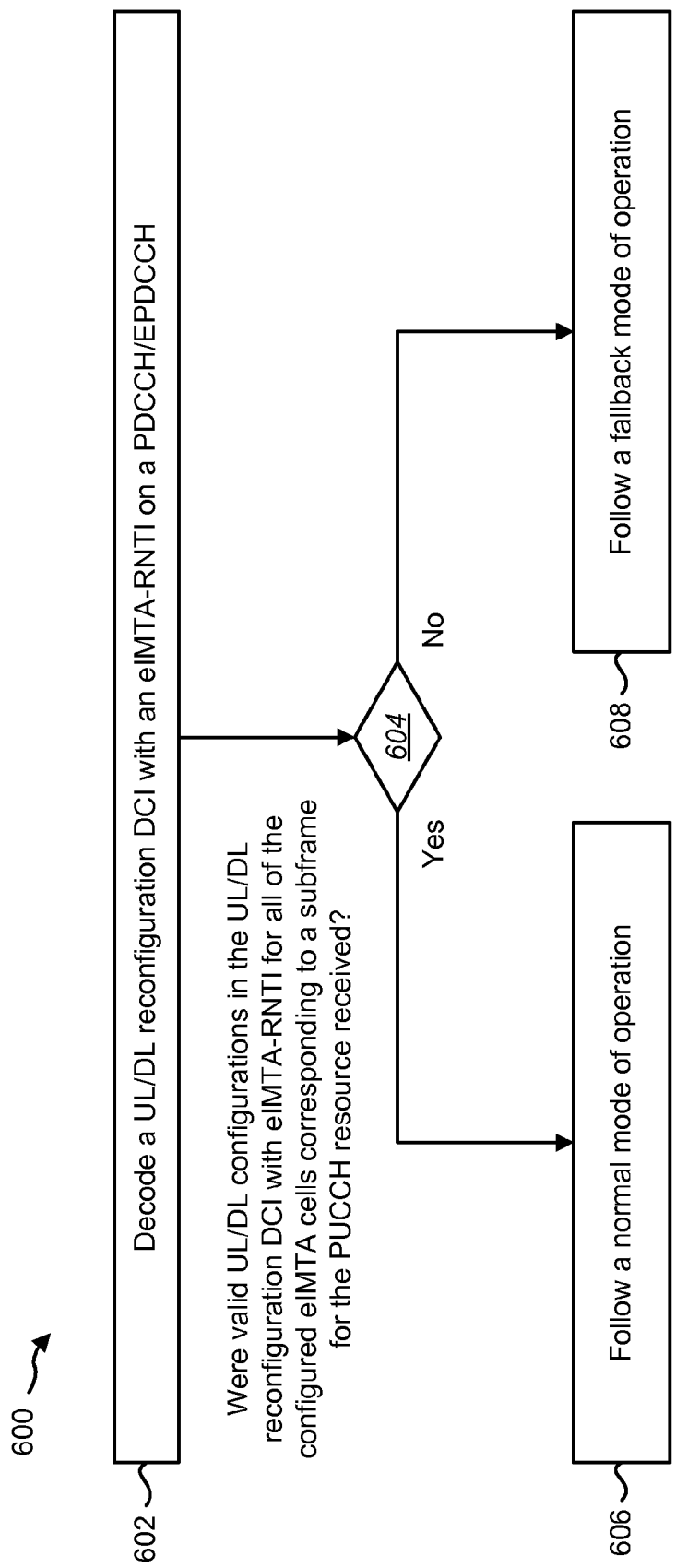
FIG. 6 is a flow diagram illustrating another implementation of a method for feedback reporting by a UE.

FIG. 6 is a flow diagram illustrating another implementation of a method 600 for feedback reporting by a UE 102. The UE 102 may decode 602 a UL/DL reconfiguration DCI with an eIMTA-RNTI on a PDCCH/EPDCCH. In some implementations, the UL/DL reconfiguration DCI is carried on the common search space (CSS). The UL/DL reconfiguration DCI with an eIMTA-RNTI may be received from an eNB 160. In some implementations, eIMTA may provide flexible use of spectrum using dynamic UL/DL allocation based on traffic load. Explicit L1 reconfiguration signaling may be used to indicate the actual TDD UL/DL configuration by group-common DCI only in a PCell common search space for a UE 102. The size of DCI that carries reconfiguration bits may be aligned to DCI format 1C. The number of eIMTA-RNTI configured for a UE 102 may be 1. The eIMTA-RNTI may be UE-specifically configured via RRC. Different UEs 102 may be configured with different eIMTA-RNTIs. The explicit reconfiguration DCI may only carry information for explicit UL/DL reconfiguration.

A reconfiguration window may be configured with periodicity of 10 milliseconds (ms), 20 ms, 40 ms and/or 80 ms. The set of subframes that a UE 102 is configured to monitor for reconfiguration signaling may be based on these periodicities. For a 10 ms periodicity, the set of subframes may be the DL subframes and special subframes per SIB1. For a 20 ms periodicity, the set of subframes may be the DL subframes and special subframes per SIB1 in the second radio frame in the window. For a 40 ms periodicity, the set of subframes may be the DL subframes and special subframes per SIB1 in the fourth radio frame in the window. For an 80 ms periodicity, the set of subframes may be the DL subframes and special subframes per SIB1 in the eighth radio frame in the window.

If a UE 102 is configured to monitor multiple subframes for reconfiguration DCIs in radio frames $\{m \cdot T/10, m \cdot T/10+1, \ldots, (m+1) \cdot T/10-1\}$, the UE 102 may assume the same UL/DL configuration indicated by the reconfiguration DCIs for radio frames $\{m \cdot T/10, m \cdot T/10+1, \ldots, (m+1) \cdot T/10-1\}$. As used herein, the same UL/DL configuration refers to any cell configured for the UE 102 with eIMTA enabled.

In one implementation, the UE 102 is required to monitor all subframes to carry reconfiguration DCI(s) for radio frames $\{m \cdot T/10, m \cdot T/10+1, \ldots, (m+1) \cdot T/10-1\}$ at least until one valid UL-DL configuration for radio frames $\{m \cdot T/10, m \cdot T/10+1, \ldots, (m+1) \cdot T/10-1\}$ is detected (e.g., received).

If the UE 102 detects L1 signaling conveying a valid UL/DL configuration for a radio frame, the UE 102 may monitor the non-discontinuous reception (DRX) DL subframes or special subframes indicated by explicit L1 signaling, referred to herein as normal operation (e.g., the UE 102 follows 606 a normal mode of operation). If the UE 102 does not detect L1 signaling conveying a valid UL/DL configuration for a radio frame, the UE 102 may monitor the non-DRX DL subframes or special subframes for PDCCH or EPDCCH as indicated by an SIB1 configuration, referred to herein as fallback mode operation (e.g., the UE 102 follows 608 a fallback mode of operation).

Under fallback operation, if the UE 102 receives a UL grant corresponding to at least one UL subframe per a SIB1 not in the set of UL subframes per the DL HARQ reference configuration, then the UE 102 may still treat the UL grant as a valid UL grant. Also, under fallback operation, if the UE 102 receives a NACK in a PHICH triggering a PUSCH transmission in a UL subframe per a SIB1 not in the set of UL subframes per the DL HARQ reference configuration, the UE 102 may transmit a PUSCH transmission.

For PDSCH HARQ-ACK timing, the DL HARQ-ACK timing may follow a higher layer RRC configured TDD configuration chosen from UL/DL configurations #2, #4 and #5, described above in connection with FIG. 5. HARQ-ACK bundling may not be supported for HARQ-ACK feedback for TDD eIMTA. PUCCH format 3 and PUCCH format 1b with channel selection may be supported for eIMTA.

According to one approach for PDCCH scheduling, the existing implicit PUCCH resource for subframes with the same DL HARQ timing may be reused between eIMTA and non-eIMTA UEs 102. New resources for other subframes may be allocated in the bundling window. The new resources may be based on a starting PUCCH offset that is separately configured via RRC. The block interleaving for ACK/NAK resource indexing may still be supported.

If TDD eIMTA is not enabled on the PCell but is enabled on at least one SCell, then the UE 102 behavior for HARQ-ACK feedback when PUCCH format 3 is configured may follow the HARQ-ACK feedback as specified in Release-10 or 11.

While the above approach describes fallback mode behavior and DL HARQ-ACK timing, the approach does not specify detailed HARQ-ACK reporting on PUCCH. In particular, the described approach does not provide for HARQ-ACK fallback operation to format 1a/1b when PUCCH format 3 is configured. Additionally, the described approach does not specify the number of HARQ-ACK bits to be reported on PUCCH format 3.

A UE 102 operating according to the systems and methods described herein may minimize the HARQ-ACK payload under normal mode and fallback mode operation. Furthermore, the described systems and methods provide for implicitly reporting the detection of reconfiguration signaling by PUCCH channel selection. If the UE 102 does not detect a reconfiguration DCI with eIMTA-RNTI in a PCell PDCCH common search space (CSS), the HARQ-ACK may be reported on a different PUCCH resource than the PUCCH resource used during normal operation.

HARQ-ACK reporting may be performed according to different implementations. In one implementation, the number of HARQ-ACK bits may be determined by the DL HARQ reference configuration. This implementation may result in an unnecessarily large HARQ-ACK payload, which may reduce PUCCH performance. In another implementation, the number of HARQ-ACK bits may be determined by the DL and special subframes according to the UL/DL configuration in the reconfiguration DCI. However, there may be ambiguity issues if the UE 102 does not detect the PHY reconfiguration DCI correctly and performs a fallback mode operation.

In one approach, an ACK/NACK bit for the PHY reconfiguration DCI may be reported together with the HARQ-ACK bits. However, this may increase the HARQ-ACK payload, may impact the total number of bits reported on a PUCCH, and may impact the maximum number of cells that can be configured for a UE 102.

The systems and methods described herein provide for implicit feedback for the reconfiguration DCI. Compared with the approach described above, the PUCCH resource selection described herein may also reduce the total HARQ-ACK payload. In particular, the HARQ-ACK payload may be reduced when the reconfiguration DCI is not correctly received by the UE 102.

As described above, for an eIMTA cell, the reconfiguration window can be configured with different periodicities (e.g., 10 ms, 20 ms, 40 ms and 80 ms). For an uplink subframe n with PUCCH HARQ-ACK report, the detection status of the reconfiguration DCI with eIMTA-RNTI may be determined based on all reconfiguration DCI signals included in the DL association set of the given uplink subframe according to the DL HARQ reference configuration.

For each eIMTA cell, if the subframes in the DL association set of the given uplink subframe according to the DL HARQ reference configuration belong to one reconfiguration period, the status of the reconfiguration DCI with eIMTA-RNTI may be based on whether a valid UL/DL configuration in the reconfiguration DCI with eIMTA-RNTI for the given reconfiguration period is detected (e.g., received) or not.

For each eIMTA cell, if the subframes in the DL association set of the given uplink subframe according to the DL HARQ reference configuration belong to two reconfiguration periods, the status of the reconfiguration DCI with eIMTA-RNTI may be based on whether valid UL/DL configurations in all the reconfiguration DCI signals with eIMTA-RNTI for the two reconfiguration periods are detected or not. If a valid UL/DL configuration is not detected in either of the two reconfiguration DCI signals, valid UL/DL configuration in the reconfiguration DCI with eIMTA-RNTI is considered as not detected.

If there is more than one eIMTA cell configured, the eIMTA cell may be configured with different periodicities. A reconfiguration DCI with eIMTA-RNTI may include reconfiguration signals of multiple eIMTA cells and is signaled on the PCell CSS only.

If there is more than one eIMTA cell configured, for the PUCCH reporting in a given uplink subframe, valid UL/DL configurations in the reconfiguration DCI with eIMTA-RNTI are considered as detected if valid UL/DL configurations in the reconfiguration DCI signals for all eIMTA cells are correctly detected based on the DL association set of the uplink of each eIMTA cell. Furthermore, valid UL/DL configurations in the reconfiguration DCI with eIMTA-RNTI are considered as not detected if a valid UL/DL configuration in the reconfiguration DCI signal of any eIMTA cell is not detected based on the DL association set of the uplink of the eIMTA cell.

For an eIMTA cell operating according to the systems and methods described herein, PDSCH HARQ-ACK reporting may follow the DL-reference UL/DL configuration of the serving cell to determine the DL association set, as in Table (3) (from Table 10.1.3.1-1 of 3GPP TS 36.213). Table (3) provides a downlink association set index K: $\{k_0, k_1, \ldots k_{M-1}\}$.

TABLE (3)

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As one way to report the PDSCH HARQ-ACK, the number of subframes included in the PDSCH HARQ-ACK reporting should be $M_{DL-Ref}$, where $M_{DL-Ref}$ is the number of elements in the DL association set K defined in Table (3) for the DL HARQ reference UL/DL configuration of the eIMTA cell. This may provide the correct understanding between the eNB 160 and the UE 102. On the other hand, the number of PDSCH HARQ-ACK bits may become large because all $M_{DL-Ref}$ subframes in the DL association set should be included in the report. The number of PDSCH HARQ-ACK bits may become very large if UL/DL configuration 5 is used as the DL-reference UL/DL configuration. Furthermore, the traditional PDSCH HARQ-ACK reporting cannot indicate whether the UL/DL reconfiguration signaling is correctly received or not.

If the UE 102 receives the reconfiguration signaling correctly, the UE 102 knows the DL and special subframes in the DL association set according to the UL/DL configuration in the reconfiguration DCI. In one implementation, $M_{Reconfig-DCI}$ may be defined as the number of DL and special subframes according to the UL/DL configuration in the reconfiguration DCI in the set K defined in Table (3) for the DL HARQ reference UL/DL configuration of the eIMTA cell. Thus, the UE 102 may report the HARQ-ACK based on the DL and special subframes corresponding to the reconfiguration DCI. In other words, the UE 102 may report the HARQ-ACK based on $M_{Reconfig-DCI}$ instead of using $M_{DL-Ref}$ for all subframes in the association set.

It should be noted that the number of DL and special subframes in a DL association may be different from the current or the previous UL/DL configuration if the DL association set includes subframes with different UL/DL configurations due to reconfiguration. Therefore, the UE 102 may use the number of DL and special subframes according to the UL/DL configuration in the reconfiguration DCI in each association set in the PDSCH HARQ-ACK report if the eNB 160 knows that the UE 102 correctly detects the reconfiguration signaling. Thus, feedback from the UE 102 to the eNB 160 may indicate whether the UE 102 detects the reconfiguration DCI. It should also be noted that in some implementations, the UE 102 may not follow $M_{Reconfig-DCI}$. It is possible for the UE 102 to use $M_{DL-Ref}$ even if the UE 102 receives the reconfiguration DCI correctly.

The UE 102 may determine 604 whether valid UL/DL configurations in the UL/DL reconfiguration DCI with eIMTA-RNTI for all of the configured eIMTA cells corresponding to a subframe for the PUCCH resource are received. The UE 102 may operate according to normal and fallback modes of operation. If the UE 102 determines 604 that valid UL/DL configurations in the UL/DL reconfiguration DCI with eIMTA-RNTI of all configured eIMTA cells corresponding to a subframe for the PUCCH resource are detected (e.g., received), then the UE 102 may follow 606 a normal mode of operation.

While in a normal mode of operation, the UE 102 may minimize the HARQ-ACK bits on a PUCCH or PUSCH feedback. If one or more valid UL/DL configurations in the reconfiguration DCI with eIMTA-RNTI on the PCell CSS are detected, and if the UE 102 is configured with PUCCH format 3, then the UE 102 may determine the number of HARQ-ACK bits based on the DL and special subframes according to the UL/DL configuration in the reconfiguration DCI in the given DL association set. Thus, if the eIMTA cell is a SCell, if the UE 102 detects any PDSCH transmission targeted to the UE 102 on the SCell, the HARQ-ACK bits of all cells may be reported on PUCCH format 3. Also, if the eIMTA cell is a PCell, if the UE 102 detects more than one PDSCH transmission, except the SPS if configured, then the HARQ-ACK of all cells may be reported on PUCCH format 3.

The PUCCH format 3 resource may be configured by higher layer signaling and may be indicated by the TPC field if the PDSCH is scheduled by a PDCCH on a PCell or a PDCCH/EPDCCH on a SCell. The PUCCH format 3 resource may be configured by higher layer signaling and indicated by the HARQ-ACK resource offset (e.g., ARO) bits if the PDSCH is scheduled by an EPDCCH on the PCell. This may be accomplished as described in connection with FIG. 7.

While in a normal mode of operation (e.g., when valid UL/DL configurations in the UL/DL reconfiguration DCI with eIMTA-RNTI of all configured eIMTA cells corresponding to a subframe for the PUCCH resource are detected), if there is only one PDSCH with a DAI value of 1 in a PDCCH or EPDCCH that is detected on the PCell, a HARQ-ACK fallback mode may be used. In this case, if the eIMTA cell is a PCell, and if there is only a SPS subframe detected, or if there is only one PDSCH detected with a DAI value of 1 in a PDCCH or EPDCCH on the PCell only, the HARQ-ACK bits may be reported with a PUCCH format 1a/1b instead of PUCCH format 3.

The DAI may be a field in the downlink resource grant that is signaled to the UE 102. The DAI may indicate how many subframes in a previous time window contained transmissions to the UE 102. Using the DAI, the UE 102 may determine whether it has received all the downlink transport blocks for which it should transmit HARQ-ACK feedback.

The PUCCH format 1a/1b resource may be determined (e.g., selected) by the PUCCH resource allocation procedures defined for eIMTA. For example, the PUCCH resources for the fixed DL and special subframes in an SIB1 configuration may be mapped according to Rel-8/9/10/11/12 UEs 102. A new PUCCH resource region and subframe interleaver may be applied for the PUCCH resource mapping of the remaining DL and special subframes specified by UL/DL configuration in the reconfiguration DCI or the DL HARQ reference configuration.

If the UE 102 determines 604 that at least one valid UL/DL configuration in the UL/DL reconfiguration DCI with eIMTA-RNTI for at least one configured eIMTA cell corresponding to a subframe for the PUCCH resource is not detected, then the UE 102 may follow 608 a fallback mode of operation. If a valid UL/DL configuration in the reconfiguration DCI with eIMTA-RNTI on the PCell CSS is not detected, the UE 102 may perform fallback mode operation by monitoring the DL and special subframes specified by the SIB1 configuration only. In this case, some PDSCH transmissions may be missed by the UE 102. Therefore, the UE 102 may not be able to report the HARQ-ACK bits correctly since the UE 102 does not know the actual subframe allocation.

If valid UL/DL configuration in the reconfiguration DCI with eIMTA-RNTI on the PCell CSS is not detected, and if the UE 102 is configured with PUCCH format 3, the PUCCH report may use a different PUCCH resource from the normal mode operation. In one implementation, the PUCCH resource may be determined (e.g., selected) by an offset value. As used herein, "an offset value" refers to a fixed or predefined value (e.g., +1) to point to another PUCCH resource. The offset value may be a fixed or predefined value with modular 4 operation to determine the PUCCH resource index of the four PUCCH resource values configured by higher layers.

In another implementation, the PUCCH resource may be determined by a separately configured PUCCH resource. As used herein, "a separately configured PUCCH resource" refers to a separate PUCCH resource that can be configured by higher layer signaling (e.g., RRC signaling).

The PUCCH resource selection implicitly reports whether valid UL/DL configuration in the reconfiguration DCI is detected or not by the UE 102. For example, the use of one PUCCH resource may indicate that the UE 102 detected valid UL/DL configurations in the reconfiguration DCI, while the use of another PUCCH resource may indicate that the UE 102 did not detect one or more valid UL/DL configurations in the reconfiguration DCI. Detailed PUCCH resource mapping with an offset or a separately configured PUCCH resource is described below in connection with FIG. 8.

If the reconfiguration DCI with eIMTA-RNTI on PCell CSS is not correctly detected, the PUCCH resource used for HARQ-ACK reporting can be determined by a fixed or predefined offset (e.g., +1) over the normal PUCCH resource, or can be configured by higher layer signaling.

In one implementation, if the eIMTA cell is an SCell and if the UE 102 detects any PDSCH transmission targeted to the UE 102 on an SCell, the HARQ-ACK information of all cells may be reported on PUCCH format 3. Also, if the eIMTA cell is a PCell and if the UE 102 detects more than one PDSCH transmission (excluding the SPS, if configured), the HARQ-ACK information of all cells may be reported on PUCCH format 3. The normal PUCCH format 3 resource may be configured by higher layer signaling and may be indicated by the TPC field (i.e. an ARI) if the PDSCH is scheduled by a PDCCH, or the TPC field and ARO bits if the PDSCH is scheduled by an EPDCCH.

If one or more valid UL/DL configurations in the reconfiguration DCI with eIMTA-RNTI on the PCell CSS are not detected, the actual DL and special subframe allocation is unknown to the UE 102 according to the UL/DL configuration in the reconfiguration DCI. In this case, the UE 102 may monitor only the DL and special subframes specified by the SIB1 configuration. Since some subframes are not monitored, there may be mismatch on the DAI values. During fallback operation, the UE 102 may perform HARQ-ACK reporting on PUCCH format 3 if valid UL/DL configuration in the reconfiguration DCI with eIMTA-RNTI on the PCell CSS is not detected.

In one approach for HARQ-ACK reporting on PUCCH format 3 if valid UL/DL configuration in the reconfiguration DCI with eIMTA-RNTI on the PCell CSS is not detected, the UE 102 may report HARQ-ACK bits based on the DL or special subframes defined by the DL HARQ reference configuration. The HARQ-ACK bits may be ordered based on the detected DAI values. NACK may be padded for the missing DAI values and the HARQ-ACK bits for the remaining subframes for all subframes in the DL association set given by the DL HARQ reference configuration. This approach ensures a correct interpretation of the DAI bits by the eNB 160. However, this approach may utilize a higher HARQ-ACK payload, which may require more PUCCH transmission power.

In a second approach for HARQ-ACK reporting on PUCCH format 3 if valid UL/DL configuration in the reconfiguration DCI with eIMTA-RNTI on the PCell CSS is not detected, the UE 102 may report the HARQ-ACK bits based on subframe allocation of the SIB1 configuration. Thus, in the DL association set given by the DL HARQ reference configuration, only the fixed DL and special subframes indicated by SIB1 configuration are reported.

In one implementation, the HARQ-ACK bits are ordered based on the detected DAI values, NACK is padded for the remaining bits for all fixed DL or special subframes only. This implementation provides the minimum HARQ-ACK payload on a PUCCH reporting. In some cases of mismatch of DAI values (e.g., some missing DAI values before or between detected PDSCH transmissions), no NACK may be added.

In another implementation, the DAI values can be ignored, and the HARQ-ACK bits may be reported for all the fixed DL and special subframes in the DL association set following the subframe ordering in timing, or the subframe ordering according to the DL association set. A NACK bit may be added if there is no PDSCH detected in a fixed DL or special subframe in the DL association set.

In some scenarios, the HARQ-ACK bits may be reported with PUCCH format 1a/1b instead of PUCCH format 3. If a valid UL/DL configuration in the reconfiguration DCI with eIMTA-RNTI on the PCell CSS is not detected, the HARQ-ACK fallback mode may also be used if there is only one PDSCH with a DAI value of 1 that is detected on the PCell. Therefore, if the eIMTA cell is a PCell, if there is only a SPS subframe detected, or if there is only one PDSCH detected with a DAI value of 1 on the PCell only, the HARQ-ACK bits may be reported with PUCCH format 1a/1b instead of PUCCH format 3.

Three alternatives may be considered for the PUCCH format 1a/1b resource. With a first alternative, a different PUCCH 1a/1b resource from the normal operation PUCCH resource may be used to carrier the HARQ-ACK. If a valid UL/DL configuration in the reconfiguration DCI with eIMTA-RNTI on the PCell CSS is not detected, the PUCCH format 1a/1b resource may be determined by the normal PUCCH 1a/1b resource allocation procedures defined for eIMTA and an offset value. The offset value can be a fixed or predefined value (e.g., +1) pointing to another PUCCH resource. In a second alternative, if a valid UL/DL configuration in the reconfiguration DCI with eIMTA-RNTI on the PCell CSS is not detected, the PUCCH format 1a/1b resource may be configured by higher layer signaling (e.g., RRC signaling). In a third alternative, none of a fixed or predefined value and a separate PUCCH resource is used. Instead, an implicit PUCCH format 1a/1b resource is used. In this third alternative, the UE 102 may follow the number of CCEs.

In yet another implementation, and without loss of generality, HARQ-ACK reporting of an eIMTA cell may also be performed by switching the normal mode operation and fallback mode operation described herein. In this implementation, if a valid UL/DL configuration in the reconfiguration DCI with eIMTA-RNTI on the PCell CSS is not detected (e.g., fallback mode), the PUCCH format 3 resource may be determined by the TPC field (e.g., ARI) in the case of PDCCH scheduling, or the TPC field and ARO in the case of EPDCCH scheduling. If valid UL/DL configurations in the reconfiguration DCI with eIMTA-RNTI on the PCell CSS are correctly detected (e.g., normal mode), the PUCCH format 3 resource may be determined with an offset value. The offset can be a fixed or predefined number, or the offset may be RRC configured.

The benefits of the described systems and methods for HARQ-ACK reporting of an eIMTA cell include minimizing the HARQ-ACK payload on PUCCH. PUCCH resource selection may be utilized to feedback whether valid UL/DL configuration in the reconfiguration DCI with eIMTA-RNTI is detected or not. The described systems and methods provide backward compatible operations and utilize shared resources with legacy UEs 102.

Figure 7:
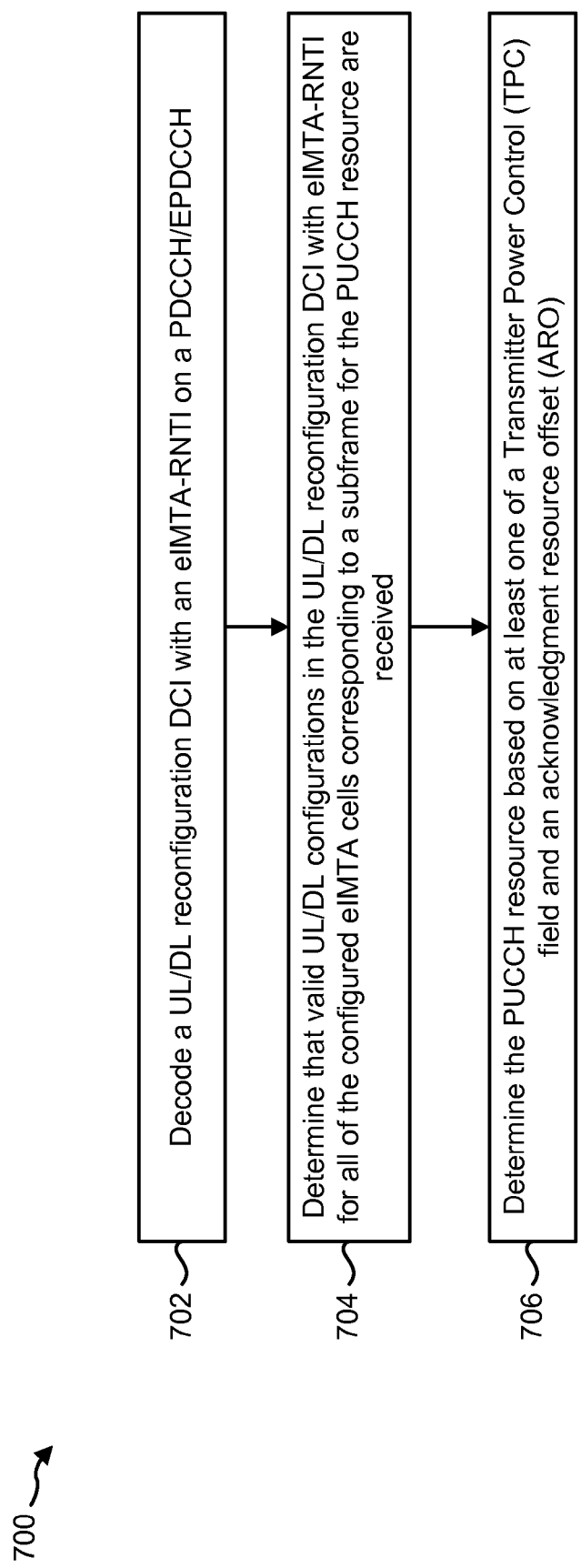
FIG. 7 is a flow diagram illustrating one implementation of a method for feedback reporting by a UE while in a normal mode of operation.

FIG. 7 is a flow diagram illustrating one implementation of a method 700 for feedback reporting by a UE 102 while in a normal mode of operation. The UE 102 may decode 702 a UL/DL reconfiguration DCI with an eIMTA-RNTI on a PDCCH/EPDCCH. The UL/DL reconfiguration DCI with an eIMTA-RNTI may be received from an eNB 160. Explicit reconfiguration signaling (e.g., the reconfiguration DCI) may be used to indicate the actual TDD UL/DL configuration. The eIMTA-RNTI may be UE-specifically configured via RRC. Different UEs 102 may be configured with different eIMTA-RNTIs.

The UE 102 may determine 704 that valid UL/DL configurations in the UL/DL reconfiguration DCI with eIMTA-RNTI for all of the configured eIMTA cells corresponding to a subframe for the PUCCH resource are received. The status of the reconfiguration DCI with eIMTA-RNTI may be based on whether a valid UL/DL configuration in the reconfiguration DCI with eIMTA-RNTI for a given reconfiguration period is detected (e.g., received) or not. If the UE 102 determines 704 that valid UL/DL configurations in the UL/DL reconfiguration DCI with eIMTA-RNTI of all configured eIMTA cells corresponding to a subframe for the PUCCH resource are detected (e.g., received), then the UE 102 may follow a normal mode of operation.

The UE 102 may determine 706 the PUCCH resource based on at least one of a TPC field (e.g., ARI) and an ARO. While in a normal mode of operation, the UE 102 may minimize the HARQ-ACK bits on a PUCCH or PUSCH feedback.

If one or more valid UL/DL configurations in the reconfiguration DCI with eIMTA-RNTI on the PCell CSS are detected, and if the UE 102 is configured with PUCCH format 3, then the UE 102 may determine the number of HARQ-ACK bits based on the DL and special subframes according to the UL/DL configuration in the reconfiguration DCI in the given DL association set. Thus, if the eIMTA cell is an SCell, and if the UE 102 detects any PDSCH transmission targeted to the UE 102 on the SCell, the HARQ-ACK bits of all cells may be reported on PUCCH format 3. Also, if the eIMTA cell is a PCell, and if the UE detects more than one PDSCH transmission, except the SPS if configured, HARQ-ACK of all cells may be reported on PUCCH format 3.

The PUCCH format 3 resource may be configured by higher layer signaling and may be indicated by the TPC field if the PDSCH is scheduled by a PDCCH on a PCell or an PDCCH/EPDCCH on a SCell. The PUCCH format 3 resource may be configured by higher layer signaling and indicated by the HARQ-ACK resource offset (e.g., ARO) bits if the PDSCH is scheduled by an EPDCCH on the PCell.

For a PDSCH transmission on an SCell indicated by the detection of a corresponding PDCCH, and for M>1 and a PDSCH transmission only on the PCell indicated by the detection of a corresponding PDCCH in subframe $n-k_m$, where $k_m \in K$, with the DAI value in the PDCCH greater than 1 or a PDCCH indicating downlink SPS release in subframe $n-k_m$, where $k_m \in K$, with the DAI value in the PDCCH greater than 1, the UE 102 may use PUCCH format 3, PUCCH resource $n_{PUCCH}^{(3,\tilde{p})}$ and the TPC field in a PDCCH assignment with a DAI value greater than 1 to determine the PUCCH resource value from one of the four PUCCH resource values configured by higher layers, with the mapping defined in Table (4). The value of $n_{PUCCH}^{(3,\tilde{p})}$ is determined according to higher layer configuration and Table (4) (from 3GPP TS 36.213, v. 11.4, table 10.1.2.2.2-1).

TABLE (4)

| Value of 'TPC command for PUCCH' or 'HARQ-ACK resource offset' | $n_{PUCCH}^{(3,\tilde{p})}$ |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

A UE 102 may assume that the same HARQ-ACK PUCCH resource value is transmitted on all PDCCH assignments used to determine the PUCCH resource values within the subframe(s) n−k, where k∈K.

For a PDSCH transmission on an SCell indicated by the detection of a corresponding EPDCCH, for M>1 and a PDSCH transmission only on the PCell indicated by the detection of a corresponding EPDCCH in subframe n−$k_m$, where $k_m$∈K with the DAI value in the EPDCCH greater than 1 or an EPDCCH indicating downlink SPS release in subframe n−$k_m$, where $k_m$∈K with the DAI value in the EPDCCH greater than 1, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the HARQ-ACK resource offset field in the DCI format of the corresponding EPDCCH assignment with DAI value greater than 1 to determine the PUCCH resource value from one of the four PUCCH resource values configured by higher layers, with the mapping defined in Table (4). A UE 102 may assume that the same HARQ-ACK PUCCH resource value is transmitted on all EPDCCH assignments used to determine the PUCCH resource values within the subframe(s) n−k, where k∈K.

If the UL/DL configurations of all serving cells are the same, for a PDSCH transmission on the SCell indicated by the detection of a corresponding PDCCH/EPDCCH within subframe(s) n−k, where k∈K, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the TPC field in the corresponding PDCCH/EPDCCH to determine the PUCCH resource value from one of the four resource values configured by higher layers, with the mapping defined in Table (4).

For TDD UL/DL configurations 1-6, if a PDCCH corresponding to a PDSCH on the PCell within subframe(s) n−k, where k∈K, or a PDCCH indicating downlink SPS release within subframe(s) n−k, where k∈K, is detected, the TPC field in the PDCCH with the DAI value greater than 1 may be used to determine the PUCCH resource value from one of the four resource values configured by higher layers, with the mapping defined in Table (4). A UE 102 may assume that the same HARQ-ACK PUCCH resource value is transmitted on all PDCCH assignments in the PCell and in each SCell that are used to determine the PUCCH resource value within the subframe(s) n−k, where k∈K.

For TDD UL/DL configurations 1-6, if an EPDCCH corresponding to a PDSCH on the primary cell within subframe(s) n−k, where k∈K, or an EPDCCH indicating downlink SPS release within subframe(s) n−k, where k∈K, is detected, the HARQ-ACK resource offset field in the DCI format of the corresponding EPDCCH assignment with the DAI value greater than 1 shall be used to determine the PUCCH resource value from one of the four resource values configured by higher layers, with the mapping defined in Table (4). A UE 102 may assume that the same HARQ-ACK PUCCH resource value is transmitted on all EPDCCH assignments in the PCell and in each SCell that are used to determine the PUCCH resource value within the subframe(s) n−k, where k∈K.

If the UL/DL configurations of at least two serving cells are different, for a PDSCH transmission on the SCell indicated by the detection of a corresponding PDCCH/EPDCCH within subframe(s) n−k, where k∈K, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the TPC field in the corresponding PDCCH/EPDCCH to determine the PUCCH resource value from one of the four resource values configured by higher layers, with the mapping defined in Table (4).

For a UL/DL configuration of the PCell belonging to {1,2,3,4,5,6}, if a PDCCH corresponding to a PDSCH on the PCell within subframe(s) n−k, where k∈K, or a PDCCH indicating downlink SPS release within subframe(s) n−k, where k∈K, is detected, the TPC field in the PDCCH with the DAI value greater than 1 may be used to determine the PUCCH resource value from one of the four resource values configured by higher layers, with the mapping defined in Table (4). A UE 102 may assume that the same HARQ-ACK PUCCH resource value is transmitted on all PDCCH assignments in the PCell and in each SCell that are used to determine the PUCCH resource value within the subframe(s) n−k, where k∈K.

Further, if the UL/DL configurations of at least two serving cells are different, for a UL/DL configuration of the PCell belonging to {1,2,3,4,5,6}, if an EPDCCH corresponding to a PDSCH on the primary cell within subframe(s) n−k, where k∈K, or an EPDCCH indicating downlink SPS release within subframe(s) n−k, where k∈K, is detected, the HARQ-ACK resource offset field in the DCI format of the corresponding EPDCCH assignment with the DAI value greater than 1 may be used to determine the PUCCH resource value from one of the four resource values configured by higher layers, with the mapping defined in Table (4). A UE 102 may assume that the same HARQ-ACK PUCCH resource value is transmitted on all EPDCCH assignments in the PCell and in each SCell that are used to determine the PUCCH resource value within the subframe(s) n−k, where k∈K.

In the case where there is only one PDSCH with a DAI value of 1 in a PDCCH or EPDCCH that is detected on the PCell, a HARQ-ACK fallback mode may be used. Thus, if the eIMTA cell is a PCell, if there is only a SPS subframe detected, or if there is only one PDSCH detected with a DAI value of 1 in a PDCCH or EPDCCH on the PCell only, the HARQ-ACK bits may be reported with a PUCCH format 1a/1b instead of PUCCH format 3.

For a single PDSCH transmission only on the PCell indicated by the detection of a corresponding PDCCH in subframe n−$k_m$, where $k_m$∈K, and for a TDD UL/DL configuration of the primary cell belonging to {1,2,3,4,5,6} the DAI value in the PDCCH is equal to 1, or for a PDCCH indicating downlink SPS release in subframe n−$k_m$, where $k_m$∈K, and for a TDD UL/DL configuration of the PCell belonging to {1,2,3,4,5,6} the DAI value in the PDCCH is equal to 1, the UE 102 may use PUCCH format 1a/1b and PUCCH resource $n_{PUCCH}^{(1,\tilde{p})}$ with $n_{PUCCH}^{(1,\tilde{p})}$ (M−m−1)·$N_c$+m·$N_{c+1}$+$n_{CCE,m}$+$N_{PUCCH}^{(1)}$ for antenna port $p_0$. In this case, $N_{PUCCH}^{(1)}$ is configured by higher layers, c is selected from {0, 1, 2, 3} such that $N_c \leq n_{CCE,m} \leq N_{c+1}$, $$N_c = \max\{0, \lfloor [N_{RB}^{DL} \cdot (N_{sc}^{RB} \cdot c - 4)]/36 \rfloor\},$$

and $n_{CCE,m}$ is the number of the first CCE used for transmission of the corresponding PDCCH in subframe n−$k_m$, where $k_m$∈K. When a two antenna port transmission is configured for PUCCH format 1a/1b, the PUCCH resource for antenna port $p_1$ is given by $n_{PUCCH}^{(1,\tilde{p}_1)} = n_{PUCCH}^{(1,\tilde{p}_0)} + 1$.

For a single PDSCH transmission only on the PCell indicated by the detection of a corresponding EPDCCH in subframe n−$k_m$, where $k_m$∈K, and for a TDD UL/DL configuration of the primary cell belonging to {1,2,3,4,5,6} the DAI value in the EPDCCH is equal to 1, or for a PDCCH indicating downlink SPS release in subframe n−$k_m$, where $k_m$∈K, and for a TDD UL/DL configuration of the PCell belonging to {1,2,3,4,5,6} the DAI value in the EPDCCH is equal to 1, the UE 102 may use PUCCH format 1a/1b and PUCCH resource $n_{PUCCH}^{(1,\tilde{p})}$, given by the following.

If EPDCCH-PRB-set q is configured for distributed transmission, then $$n_{PUCCH}^{(1,\tilde{p})} = n_{ECCE,q} + \sum_{i1=0}^{m-1} N_{ECCE,q,n-k_{i1}} + \Delta_{ARO} + N_{PUCCH,q}^{(e1)}.$$

If EPDCCH-PRB-set q is configured for localized transmission, then $$n_{PUCCH}^{(1,\tilde{p})} = \left\lfloor \frac{n_{ECCE,q}}{N_{RB}^{ECCE,q}} \right\rfloor \cdot N_{RB}^{ECCE,q} + \sum_{i1=0}^{m-1} N_{ECCE,q,n-k_{i1}} + n' + \Delta_{ARO} + N_{PUCCH,q}^{(e1)}.$$

In this case, $n_{ECCE,q}$ is the number of the first enhanced control channel element (ECCE) (i.e. the lowest ECCE index used to construct the EPDCCH) used for transmission of the corresponding DCI assignment in EPDCCH-PRB-set q in subframe $n-k_m$, $N_{PUCCH,q}^{(e1)}$ for EPDCCH-PRB-set q is configured by the higher layer parameter PUCCH-ResourceStartOffset-r11, and n' is determined from the antenna port used for EPDCCH transmission in subframe $n-k_m$.

If m=0, $\Delta_{ARO}$ is determined from the HARQ-ACK resource offset field in the DCI format of the corresponding EPDCCH, as given in Table (5) (from 3GPP TS 36.213, v. 11.4, table 10.1.2.1-1).

TABLE (5)

| ACK/NACK Resource offset field in DCI format 1A/1B/1D/1/2A/2/2B/2C/2D | $\Delta_{ARO}$ |
|---|---|
| 0 | 0 |
| 1 | -1 |
| 2 | -2 |
| 3 | 2 |

If m>0, $\Delta_{ARO}$ is determined from the HARQ-ACK resource offset field in the DCI format of the corresponding EPDCCH, as given in Table (6) (from 3GPP TS 36.213, v. 11.4, table 10.1.3.1-2).

TABLE (6)

| ACK/NACK Resource offset field in DCI format 1A/1B/1D/1/2A/2/2B/2C/2D | $\Delta_{ARO}$ |
|---|---|
| 0 | 0 |
| 1 | $-\sum_{i1=0}^{m-1} N_{ECCE,q,n-k_{i1}} - 2$ |
| 2 | $-\sum_{i1=m-\lceil m/3 \rceil}^{m-1} N_{ECCE,q,n-k_{i1}} - 1$ |
| 3 | 2 |

If the UE 102 is configured to monitor EPDCCH in subframe $n-k_{i1}$, $N_{ECCE,q,n-k_{i1}}$ is equal to the number of ECCEs in EPDCCH-PRB-set q configured for that UE 102 in subframe $n-k_{i1}$. If the UE 102 is not configured to monitor EPDCCH in subframe $n-k_{i1}$, $N_{ECCE,q,n-k_{i1}}$ is equal to the number of ECCEs computed assuming EPDCCH-PRB-set q is configured for that UE 102 in subframe $n-k_{i1}$.

For normal downlink cyclic prefix (CP), if subframe $n-k_{i1}$ is a special subframe with special subframe configuration 0 or 5, $N_{ECCE,q,n-k_{i1}}$ is equal to 0. For extended downlink CP, if subframe $n-k_{i1}$ is a special subframe with special subframe configuration 0 or 4 or 7, $N_{ECCE,q,n-k_{i1}}$ is equal to 0. When a two antenna port transmission is configured for PUCCH format 1a/1b, the PUCCH resource for antenna port $p_1$ is given by $n_{PUCCH}^{(1,\tilde{p}_1)} = n_{PUCCH}^{(1,\tilde{p}_0)} + 1$.

For a single PDSCH transmission only on the PCell where there is not a corresponding PDCCH/EPDCCH detected within subframe(s) n−k, where k∈K, and no PDCCH/EPDCCH indicating downlink SPS release within subframe(s) n−k, where k∈K, the UE 102 may use PUCCH format 1a/1b and PUCCH resource $n_{PUCCH}^{(1,\tilde{p})}$ with the value of $n_{PUCCH}^{(1,\tilde{p})}$ determined according to higher layer configuration. For a UE 102 configured for a two antenna port transmission for PUCCH format 1a/1b, a PUCCH resource value in Table (7) (from 3GPP TS 36.213, v. 11.4, table 9.2-2) maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_1)}$ for antenna port $p_0$.

TABLE (7)

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

For M>1 and a PDSCH transmission only on the PCell where there is not a corresponding PDCCH detected within subframe(s) n−k, where k∈K and an additional PDSCH transmission only on the PCell indicated by the detection of a corresponding PDCCH in subframe $n-k_m$, where $k_m \in K$ with the DAI value in the PDCCH equal to 1 or a PDCCH indicating downlink SPS release in subframe $n-k_m$, where $k_m \in K$ with the DAI value in the PDCCH equal to 1, the UE 102 may transmit b(0),b(1) in subframe n using PUCCH format 1b on PUCCH resource $n_{PUCCH}^{(1)}$ selected from A PUCCH resources $n_{PUCCH,i}^{(1)}$ where 0≤i≤A−1, according to Table (8) (from 3GPP TS 36.213, v. 11.4, table 10.1.3.2-1) and Table (9) (from 3GPP TS 36.213, v. 11.4, table 10.1.3.2-2) for A=2 and A=3, respectively. For a UE 102 configured with a transmission mode that supports up to two transport blocks on the primary cell, A=3; otherwise, A=2.

TABLE (8)

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

TABLE (9)

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

The PUCCH resource $n_{PUCCH,0}^{(1)}$ is determined according to higher layer configuration and Table (7). The PUCCH resource $n_{PUCCH,1}^{(1)}$ is determined as $n_{PUCCH,1}^{(1)}=(M-m-1)\cdot N_c + m\cdot N_{c+1} + n_{CCE,m} + N_{PUCCH}^{(1)}$, where $N_{PUCCH}^{(1)}$ is configured by higher layers, c is selected from {0, 1, 2, 3} such that $N_c \le n_{CCE,m} < N_{c+1}$, $$N_c = \max\{0, \lfloor [N_{RB}^{DL} \cdot (N_{sc}^{RB} \cdot c - 4)]/36 \rfloor\},$$

and $n_{CCE,m}$ is the number of the first CCE used for transmission of the corresponding PDCCH in subframe $n-k_m$, where $k_m \in K$.

For a UE 102 configured with a transmission mode that supports up to two transport blocks on the PCell, the PUCCH resource $n_{PUCCH,2}^{(1)}$ is determined as $n_{PUCCH,2}^{(1)} = n_{PUCCH,1}^{(1)}+1$. HARQ-ACK(0) is the ACK/NACK/DTX response for the PDSCH without a corresponding PDCCH detected. HARQ-ACK(1) is the ACK/NACK/DTX response for the first transport block of the PDSCH indicated by the detection of a corresponding PDCCH for which the value of the DAI field in the corresponding DCI format is equal to 1 or for the PDCCH indicating downlink SPS release for which the value of the DAI field in the corresponding DCI format is equal to 1. HARQ-ACK(2) is the ACK/NACK/DTX response for the second transport block of the PDSCH indicated by the detection of a corresponding PDCCH for which the value of the DAI field in the corresponding DCI format is equal to 1.

For M>1 and a PDSCH transmission only on the PCell where there is not a corresponding EPDCCH detected within subframe(s) n-k, where k∈K, and an additional PDSCH transmission only on the PCell indicated by the detection of a corresponding EPDCCH in subframe $n-k_m$, where $k_m \in K$, with the DAI value in the EPDCCH equal to 1 or an EPDCCH indicating downlink SPS release in subframe $n-k_m$, where $k_m \in K$ with the DAI value in the EPDCCH equal to 1, the UE 102 may transmit b(0),b(1) in subframe n using PUCCH format 1b on PUCCH resource $n_{PUCCH}^{(1)}$ selected from A PUCCH resources $n_{PUCCH,i}^{(1)}$ where $0 \le i \le A-1$, according to Table (8) and Table (9) for A=2 and A=3, respectively. For a UE 102 configured with a transmission mode that supports up to two transport blocks on the primary cell, A=3; otherwise, A=2.

The PUCCH resource $n_{PUCCH,0}^{(1)}$ is determined according to higher layer configuration and Table (7). The PUCCH resource $n_{PUCCH,1}^{(1)}$ is determined according to the following. If EPDCCH-PRB-set q is configured for distributed transmission, then $$n_{PUCCH,1}^{(1)} = n_{ECCE,q} + \sum_{i1=0}^{m-1} N_{ECCE,q,n-k_{i1}} + \Delta_{ARO} + N_{PUCCH,q}^{(e1)}.$$

If EPDCCH-PRB-set q is configured for localized transmission, then $$n_{PUCCH,1}^{(1)} = \left\lfloor \frac{n_{ECCE,q}}{N_{RB}^{ECCE,q}} \right\rfloor \cdot N_{RB}^{ECCE,q} + \sum_{i1=0}^{m-1} N_{ECCE,q,n-k_{i1}} + n' + \Delta_{ARO} + N_{PUCCH,q}^{(e1)}.$$

In this case, $n_{ECCE,q}$ is the number of the first ECCE (i.e., lowest ECCE index used to construct the EPDCCH) used for transmission of the corresponding DCI assignment in EPDCCH-PRB-set q in subframe $n-k_m$, $N_{PUCCH,q}^{(1)}$ for EPDCCH-PRB-set q is configured by the higher layer parameter PUCCH-ResourceStartOffset-r11, n' is determined from the antenna port used for EPDCCH transmission in subframe $n-k_m$.

If m=0, $\Delta_{ARO}$ is determined from the HARQ-ACK resource offset field in the DCI format of the corresponding EPDCCH as given in Table (5). If m>0, $\Delta_{ARO}$ is determined from the HARQ-ACK resource offset field in the DCI format of the corresponding EPDCCH as given in Table (6). If the UE 102 is configured to monitor EPDCCH in subframe $n-k_{i1}$, $N_{ECCE,q,n-k_{i1}}$ is equal to the number of ECCEs in EPDCCH-PRB-set q configured for that UE 102 in subframe $n-k_{i1}$. If the UE 102 is not configured to monitor EPDCCH in subframe $n-k_{i1}$, $N_{ECCE,q,n-k_{i1}}$ is equal to the number of ECCEs computed assuming EPDCCH-PRB-set q is configured for that UE 102 in subframe $n-k_{i1}$.

For normal downlink CP, if subframe $n-k_{i1}$ is a special subframe with special subframe configuration 0 or 5, $N_{ECCE,q,n-k_{i1}}$ is equal to 0. For extended downlink CP, if subframe $n-k_{i1}$ is a special subframe with special subframe configuration 0 or 4 or 7, $N_{ECCE,q,n-k_{i1}}$ is equal to 0.

For a UE 102 configured with a transmission mode that supports up to two) transport blocks on the primary cell, the PUCCH resource $n_{PUCCH,2}^{(1)}$ is determined as $n_{PUCCH,2}^{(1)} = n_{PUCCH,1}^{(1)}+1$. HARQ-ACK(0) is the ACK/NACK/DTX response for the PDSCH without a corresponding EPDCCH detected. HARQ-ACK(1) is the ACK/NACK/DTX response for the first transport block of the PDSCH indicated by the detection of a corresponding EPDCCH for which the value of the DAI field in the corresponding DCI format is equal to 1 or for the EPDCCH indicating downlink SPS release for which the value of the DAI field in the corresponding DCI format is equal to 1. HARQ-ACK(2) is the ACK/NACK/DTX response for the second transport block of the PDSCH indicated by the detection of a corresponding EPDCCH for which the value of the DAI field in the corresponding DCI format is equal to 1.

Figure 8:
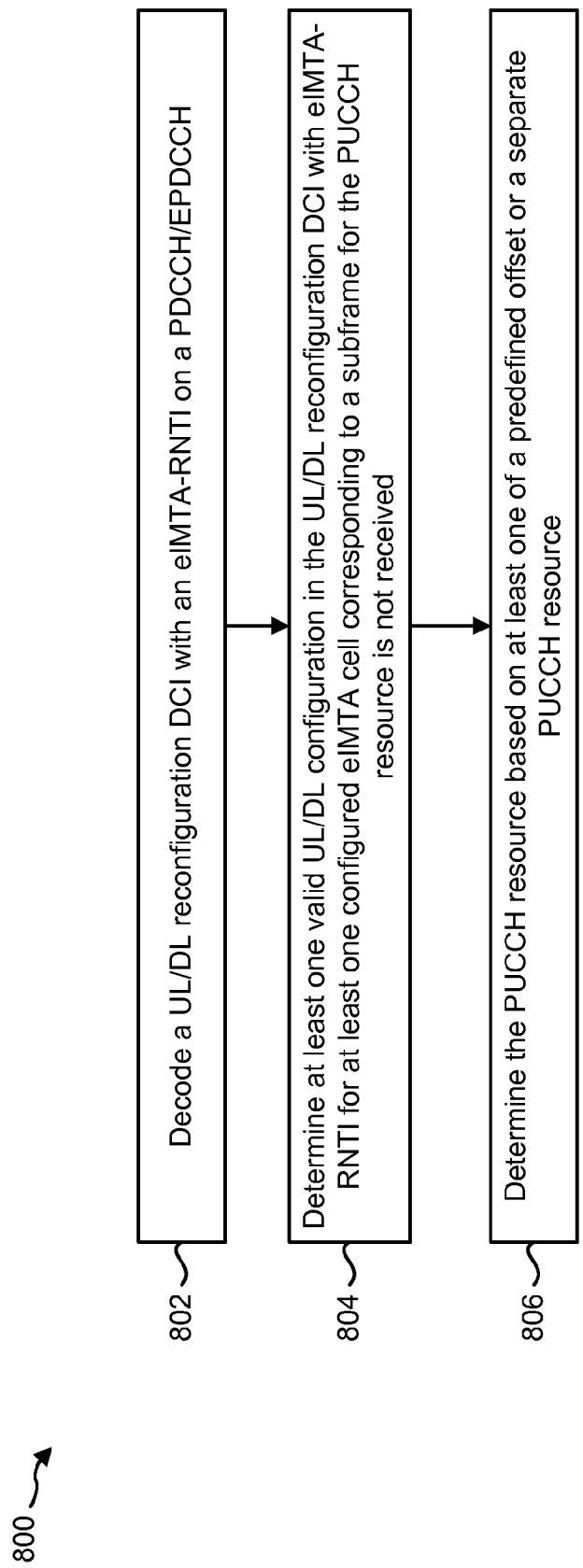
FIG. 8 is a flow diagram illustrating one implementation of a method for feedback reporting by a UE while in a fallback mode of operation.

FIG. 8 is a flow diagram illustrating one implementation of a method 800 for feedback reporting by a UE 102 while in a fallback mode of operation. The UE 102 may decode 802 a UL/DL reconfiguration DCI with an eIMTA-RNTI on a PDCCH/EPDCCH. The UL/DL reconfiguration DCI with an eIMTA-RNTI may be received from an eNB 160. Explicit reconfiguration signaling (e.g., the reconfiguration DCI) may be used to indicate the actual TDD UL/DL configuration. The eIMTA-RNTI may be UE-specifically configured via RRC. Different UEs 102 may be configured with different eIMTA-RNTIs.

The UE 102 may determine 804 that at least one valid UL/DL configuration in the UL/DL reconfiguration DCI with eIMTA-RNTI for at least one configured eIMTA cell corresponding to a subframe for the PUCCH resource is not received. The UE 102 may follow a fallback mode of operation.

The UE 102 may operate in a fallback mode if a valid UL/DL configuration in the reconfiguration DCI with eIMTA-RNTI is not detected. If a valid UL/DL configuration in the reconfiguration DCI with eIMTA-RNTI on the PCell CSS is not detected, the UE 102 may perform fallback mode operation by monitoring the DL and special subframes specified by the SIB1 configuration only. In this case, some PDSCH transmissions may be missed by the UE 102. Therefore, the UE 102 may not be able to report the HARQ-ACK bits correctly since the UE 102 does not know the actual subframe allocation.

The UE 102 may determine 806 the PUCCH resource based on at least one of a predefined offset or a separate PUCCH resource. If valid UL/DL configuration in the reconfiguration DCI with eIMTA-RNTI on the PCell CSS is not detected, and if the UE 102 is configured with PUCCH format 3, the PUCCH report may use a different PUCCH resource from the normal mode operation. In one implementation, the PUCCH resource may be determined (e.g., selected) by an offset value. The offset value may be a fixed or predefined value with modular 4 operation to determine the PUCCH resource index of the four PUCCH resource values configured by higher layers. In another implementation, the PUCCH resource may be determined by a separately configured PUCCH resource.

For a PDSCH transmission on an SCell indicated by the detection of a corresponding PDCCH, and for M>1 and a PDSCH transmission only on the PCell indicated by the detection of a corresponding PDCCH in subframe n−$k_m$, where $k_m \in K$, with the DAI value in the PDCCH greater than 1 or a PDCCH indicating downlink SPS release in subframe n−$k_m$, where $k_m \in K$, with the DAI value in the PDCCH greater than 1, the UE 102 may use PUCCH format 3, PUCCH resource $n_{PUCCH}^{(3,\tilde{p})}$ and the TPC field in a PDCCH assignment with DAI value greater than 1 may be used to determine the PUCCH resource value from one of the four PUCCH resource values configured by higher layers, with the mapping defined in Table (4).

If at least one serving cell is configured with eIMTA, and if one or more valid UL/DL configuration(s) in the UL/DL reconfiguration DCI with eIMTA-RNTI for at least one of the configured eIMTA cell(s) corresponding to a subframe for the PUCCH resource is not detected, an offset value, or a separately configured PUCCH resource may also be used to determine the PUCCH resource value from one of the four PUCCH resource values configured by higher layers. A UE 102 may assume that the same HARQ-ACK PUCCH resource value is transmitted on all PDCCH assignments used to determine the PUCCH resource values within the subframe(s) n−k, where k∈K.

For a PDSCH transmission on an SCell indicated by the detection of a corresponding EPDCCH, for M>1 and a PDSCH transmission only on the PCell indicated by the detection of a corresponding EPDCCH in subframe n−$k_m$, where $k_m \in K$ with the DAI value in the EPDCCH greater than 1 or an EPDCCH indicating downlink SPS release in subframe n−$k_m$, where $k_m \in K$ with the DAI value in the EPDCCH greater than 1, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the HARQ-ACK resource offset field in the DCI format of the corresponding EPDCCH assignment with a DAI value greater than 1 to determine the PUCCH resource value from one of the four PUCCH resource values configured by higher layers, with the mapping defined in Table (4). If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, an offset value, or a separately configured PUCCH resource may also be used to determine the PUCCH resource value. A UE 102 may assume that the same HARQ-ACK PUCCH resource value is transmitted on all EPDCCH assignments used to determine the PUCCH resource values within the subframe(s) n−k, where k∈K.

If the UL/DL configurations of all serving cells are the same, for a PDSCH transmission on the SCell indicated by the detection of a corresponding PDCCH/EPDCCH within subframe(s) n−k, where k∈K, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the TPC field in the corresponding PDCCH/EPDCCH to determine the PUCCH resource value from one of the four resource values configured by higher layers, with the mapping defined in Table (4). If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separate configured PUCCH resource may also be used to determine the PUCCH resource value.

For TDD UL/DL configurations 1-6, if a PDCCH corresponding to a PDSCH on the PCell within subframe(s) n−k, where k∈K, or a PDCCH indicating downlink SPS release within subframe(s) n−k, where k∈K, is detected, the TPC field in the PDCCH with the DAI value greater than 1, and if at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separately configured PUCCH resource may be used to determine the PUCCH resource value from one of the four resource values configured by higher layers, with the mapping defined in Table (4). The UE 102 may assume that the same HARQ-ACK PUCCH resource value is transmitted on all PDCCH assignments in the PCell and in each SCell that are used to determine the PUCCH resource value within the subframe(s) n−k, where k∈K.

For TDD UL/DL configurations 1-6, if an EPDCCH corresponding to a PDSCH on the primary cell within subframe(s) n−k, where k∈K, or an EPDCCH indicating downlink SPS release within subframe(s) n−k, where k∈K, is detected, the HARQ-ACK resource offset field in the DCI format of the corresponding EPDCCH assignment with the DAI value greater than 1, and if at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separately configured PUCCH resource shall be used to determine the PUCCH resource value from one of the four resource values configured by higher layers, with the mapping defined in Table (4). The UE 102 may assume that the same HARQ-ACK PUCCH resource value is transmitted on all EPDCCH assignments in the PCell and in each SCell that are used to determine the PUCCH resource value within the subframe(s) n−k, where k∈K.

If the UL/DL configurations of at least two serving cells are different, for a PDSCH transmission on the SCell indicated by the detection of a corresponding PDCCH/EPDCCH within subframe(s) n−k, where k∈K, the UE 102 may use PUCCH format 3, PUCCH resource $n_{PUCCH}^{(3,\tilde{p})}$ (where the value of $n_{PUCCH}^{(3,\tilde{p})}$ is determined according to higher layer configuration and Table (4)) and the TPC field in the corresponding PDCCH/EPDCCH to determine the PUCCH resource value from one of the four resource values configured by higher layers, with the mapping defined in Table (4). If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separately configured PUCCH resource may also be used to determine the PUCCH resource value.

For a UL/DL configuration of the PCell belonging to {1,2,3,4,5,6}, if a PDCCH corresponding to a PDSCH on the PCell within subframe(s) n−k, where k∈K, or a PDCCH indicating downlink SPS release within subframe(s) n−k, where k∈K, is detected, the TPC field in the PDCCH with the DAI value greater than 1 may be used to determine the PUCCH resource value from one of the four resource values configured by higher layers, with the mapping defined in Table (4). If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separately configured PUCCH resource may also be used to determine the PUCCH resource value. The UE 102 may assume that the same HARQ-ACK PUCCH resource value is transmitted on all PDCCH assignments in the PCell and in each SCell that are used to determine the PUCCH resource value within the subframe(s) n−k, where k∈K.

Further, if the UL/DL configurations of at least two serving cells are different, for a UL/DL configuration of the PCell belonging to {1,2,3,4,5,6}, if an EPDCCH corresponding to a PDSCH on the primary cell within subframe(s) n−k, where k∈K, or an EPDCCH indicating downlink SPS release within subframe(s) n−k, where k∈K, is detected, the HARQ-ACK resource offset field in the DCI format of the corresponding EPDCCH assignment with the DAI value greater than 1 may be used to determine the PUCCH resource value from one of the four resource values configured by higher layers, with the mapping defined in Table (4). If at least one serving cell is configured with eIMTA, and valid UL/DL configuration(s) in the UL/DL reconfiguration DCI with eIMTA-RNTI for at least one of the configured eIMTA cell(s) corresponding to a subframe for the PUCCH resource is not detected, then an offset value, or a separately configured PUCCH resource may also be used to determine the PUCCH resource value. A UE 102 may assume that the same HARQ-ACK PUCCH resource value is transmitted on all EPDCCH assignments in the PCell and in each SCell that are used to determine the PUCCH resource value within the subframe(s) n−k, where k∈K.

If valid UL/DL configuration in the reconfiguration DCI with eIMTA-RNTI on PCell CSS is not detected, HARQ-ACK fallback mode may also be used if there is only one PDSCH with a DAI value of 1 is detected on the PCell. Thus, if the eIMTA cell is a PCell, if there is only a SPS subframe detected, or if there is only one PDSCH detected with a DAI value of 1 on the PCell only, the HARQ-ACK bits may be reported with PUCCH format 1a/1b instead of PUCCH format 3.

For a single PDSCH transmission only on the PCell indicated by the detection of a corresponding PDCCH in subframe n−$k_m$, where $k_m$∈K, and for a TDD UL/DL configuration of the primary cell belonging to {1,2,3,4,5,6} the DAI value in the PDCCH is equal to 1, or for a PDCCH indicating downlink SPS release in subframe n−$k_m$, where $k_m$∈K, and for a TDD UL/DL configuration of the PCell belonging to {1,2,3,4,5,6} the DAI value in the PDCCH is equal to 1, the UE 102 may use PUCCH format 1a/1b and PUCCH resource $n_{PUCCH}^{(1,\tilde{p})}$ with $n_{PUCCH}^{(1,\tilde{p}_0)}=(M-m-1)\cdot N_c + m\cdot N_{c+1} - n_{CCE,m} + N_{PUCCH}^{(1)} + \delta$ or a separately configured PUCCH resource for antenna port $p_0$. In this case, $n_{PUCCH}^{(1)}$ is configured by higher layers, c is selected from {0, 1, 2, 3} such that $N_c \leq n_{CCE,m} < N_{c+1}$, $$N_c = \max\{0, \lfloor[N_{RB}^{DL} \cdot (N_{sc}^{RB} \cdot c - 4)]/36\rfloor\},$$

and $n_{CCE,m}$ is the number of the first CCE used for transmission of the corresponding PDCCH in subframe n−$k_m$, where $k_m$∈K. If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then δ is a fixed, predefined or RRC configured offset, otherwise δ is 0. When a two antenna port transmission is configured for PUCCH format 1a/1b, the PUCCH resource for antenna port $p_1$ is given by $n_{PUCCH}^{(1,\tilde{p}_1)} = n_{PUCCH}^{(1,\tilde{p}_0)} + 1 + \delta$.

For a single PDSCH transmission only on the PCell indicated by the detection of a corresponding EPDCCH in subframe n−$k_m$, where $k_m$∈K, and for a TDD UL/DL configuration of the primary cell belonging to {1,2,3,4,5,6} the DAI value in the EPDCCH is equal to 1, or for a PDCCH indicating downlink SPS release in subframe n−$k_m$, where $k_m$∈K, and for a TDD UL/DL configuration of the PCell belonging to {1,2,3,4,5,6} the DAI value in the EPDCCH is equal to 1, the UE 102 may use PUCCH format 1a/1b and PUCCH resource $n_{PUCCH}^{(1,\tilde{p})}$ given by the following.

If EPDCCH-PRB-set q is configured for distributed transmission, then $$n_{PUCCH}^{(1,\tilde{p})} = n_{ECCE,q} + \sum_{i1=0}^{m-1} N_{ECCE,q,n-k_{i1}} + \Delta_{ARO} + N_{PUCCH,q}^{(e1)} + \delta$$

or a separately configured PUCCH resource. If EPDCCH-PRB-set q is configured for localized transmission, then $$n_{PUCCH}^{(1,\tilde{p})} = \left\lfloor \frac{n_{ECCE,q}}{N_{RB}^{ECCE,q}} \right\rfloor \cdot N_{RB}^{ECCE,q} + \sum_{i1=0}^{m-1} N_{ECCE,q,n-k_{i1}} + n' + \Delta_{ARO} + N_{PUCCH,q}^{(e1)} + \delta$$

or a separately configured PUCCH resource.

In this case, $n_{ECCE,q}$ is the number of the first ECCE (i.e. lowest ECCE index used to construct the EPDCCH) used for transmission of the corresponding DCI assignment in EPDCCH-PRB-set q in subframe n−$k_m$, $n_{PUCCH}^{(e1)}$ for EPDCCH-PRB-set q is configured by the higher layer parameter PUCCH-ResourceStartOffset-r11, and n' is determined from the antenna port used for EPDCCH transmission in subframe $n-k_m$.

If $m=0$, $\Delta_{ARO}$ is determined from the HARQ-ACK resource offset field in the DCI format of the corresponding EPDCCH, as given in Table (5). If $m>0$, $\Delta_{ARO}$ is determined from the HARQ-ACK resource offset field in the DCI format of the corresponding EPDCCH, as given in Table (6).

If the UE 102 is configured to monitor EPDCCH in subframe $n-k_{i1}$, $N_{ECCE,q,n-k_{i1}}$ is equal to the number of ECCEs in EPDCCH-PRB-set q configured for that UE 102 in subframe $n-k_{i1}$. If the UE 102 is not configured to monitor EPDCCH in subframe $n-k_{i1}$, $N_{ECCE,q,n-k_{i1}}$ is equal to the number of ECCEs computed assuming EPDCCH-PRB-set q is configured for that UE 102 in subframe $n-k_{i1}$.

For normal downlink CP, if subframe $n-k_{i1}$ is a special subframe with special subframe configuration 0 or 5, $N_{ECCE,q,n-k_{i1}}$ is equal to 0. For extended downlink CP, if subframe $n-k_{i1}$ is a special subframe with special subframe configuration 0 or 4 or 7, $N_{ECCE,q,n-k_{i1}}$ is equal to 0. If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, δ is a fixed, predefined or RRC configured offset, otherwise δ is 0. When a two antenna port transmission is configured for PUCCH format 1a/1b, the PUCCH resource for antenna port $p_1$ is given by $n_{PUCCH}^{(1,\tilde{p}_1)}=n_{PUCCH}^{(1,\tilde{p}_0)}+1+\delta$.

For a single PDSCH transmission only on the PCell where there is not a corresponding PDCCH/EPDCCH detected within subframe(s) n-k, where k∈K, and no PDCCH/EPDCCH indicating downlink SPS release within subframe(s) n-k, where k∈K, the UE 102 may use PUCCH format 1a/1b and PUCCH resource $n_{PUCCH}^{(1,\tilde{p})}$, with the value of $n_{PUCCH}^{(1,\tilde{p})}$ determined according to higher layer configuration. If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, an offset δ may be applied to determine the PUCCH resource or a separately configured PUCCH resource may be used. For a UE 102 configured for a two antenna port transmission for PUCCH format 1a/1b, a PUCCH resource value in Table (7) (maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_0)}$ for antenna port $p_0$.

For M>1 and a PDSCH transmission only on the PCell where there is not a corresponding PDCCH detected within subframe(s) n-k, where k∈K and an additional PDSCH transmission only on the PCell indicated by the detection of a corresponding PDCCH in subframe $n-k_m$, where $k_m\in K$ with the DAI value in the PDCCH equal to 1 or a PDCCH indicating downlink SPS release in subframe $n-k_m$, where $k_m\in K$ with the DAI value in the PDCCH equal to 1, the UE 102 may transmit b(0),b(1) in subframe n using PUCCH format 1b on PUCCH resource $n_{PUCCH}^{(1)}$ selected from A PUCCH resources $n_{PUCCH,i}^{(1)}$ where $0\le i\le A-1$, according to Table (8) and Table (9) for A=2 and A=3, respectively. For a UE 102 configured with a transmission mode that supports up to two transport blocks on the primary cell, A=3; otherwise, A=2.

The PUCCH resource $n_{PUCCH,0}^{(1)}$ is determined according to higher layer configuration and Table (7). The PUCCH resource $n_{PUCCH,1}^{(1)}$ is determined as $n_{PUCCH,1}^{(1)}=(M-m-1)\cdot N_c+m\cdot N_{c+1}+n_{CCE,m}+N_{PUCCH}^{(1)}+\delta$ or a separately configured PUCCH resource. $N_{PUCCH}^{(1)}$ is configured by higher layers, c is selected from {0, 1, 2, 3} such that $$N_c = \max\{0, \lfloor [N_{RB}^{DL}\cdot(N_{sc}^{RB}\cdot c - 4)]/36\rfloor\},$$

and $n_{CCE,m}$ is the number of the first CCE used for transmission of the corresponding PDCCH in subframe $n-k_m$, where $k_m\in K$. If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, then δ is a fixed or predefined or RRC configured offset, otherwise δ is 0.

For a UE 102 configured with a transmission mode that supports up to two transport blocks on the PCell, the PUCCH resource $n_{PUCCH,2}^{(1)}$ is determined as $n_{PUCCH,2}^{(1)}=n_{PUCCH,1}^{(1)}+1+\delta$. HARQ-ACK(0) is the ACK/NACK/DTX response for the PDSCH without a corresponding PDCCH detected. HARQ-ACK(1) is the ACK/NACK/DTX response for the first transport block of the PDSCH indicated by the detection of a corresponding PDCCH for which the value of the DAI field in the corresponding DCI format is equal to 1 or for the PDCCH indicating downlink SPS release for which the value of the DAI field in the corresponding DCI format is equal to 1. HARQ-ACK(2) is the ACK/NACK/DTX response for the second transport block of the PDSCH indicated by the detection of a corresponding PDCCH for which the value of the DAI field in the corresponding DCI format is equal to 1.

For M>1 and a PDSCH transmission only on the PCell where there is not a corresponding EPDCCH detected within subframe(s) n-k, where k∈K, and an additional PDSCH transmission only on the PCell indicated by the detection of a corresponding EPDCCH in subframe $n-k_m$, where $k_m\in K$, with the DAI value in the EPDCCH equal to 1 or an EPDCCH indicating downlink SPS release in subframe $n-k_m$, where $k_m\in K$ with the DAI value in the EPDCCH equal to 1, the UE 102 may transmit b(0),b(1) in subframe n using PUCCH format 1b on PUCCH resource $n_{PUCCH}^{(1)}$ selected from A PUCCH resources $n_{PUCCH,i}^{(1)}$, where $0\le i\le A-1$, according to Table (8) and Table (9) for A=2 and A=3, respectively. For a UE 102 configured with a transmission mode that supports up to two transport blocks on the primary cell, A=3; otherwise, A=2.

The PUCCH resource $n_{PUCCH,0}^{(1)}$ is determined according to higher layer configuration and Table (6). The PUCCH resource $n_{PUCCH,1}^{(1)}$ is determined according to the following. If EPDCCH-PRB-set q is configured for distributed transmission, then $$n_{PUCCH,1}^{(1)} = n_{ECCE,q} + \sum_{i1=0}^{m-1} N_{ECCE,q,n-k_{i1}} + \Delta_{ARO} + N_{PUCCH,q}^{(e1)} + \delta$$

or a separately configured PUCCH resource. If EPDCCH-PRB-set q is configured for localized transmission, then $$n_{PUCCH,1}^{(1)} = \left\lfloor \frac{n_{ECCE,q}}{N_{RB}^{ECCE,q}} \right\rfloor \cdot N_{RB}^{ECCE,q} + \sum_{i1=0}^{m-1} N_{ECCE,q,n-k_{i1}} + n' + \Delta_{ARO} + N_{PUCCH,q}^{(e1)} + \delta$$

or a separately configured PUCCH resource.

In this case, $n_{ECCE,q}$ is the number of the first ECCE (i.e., lowest ECCE index used to construct the EPDCCH) used for transmission of the corresponding DCI assignment in EPDCCH-PRB-set q in subframe $n-k_m$, $N_{PUCCH}^{(e1)}$ for EPDCCH-PRB-set q is configured by the higher layer parameter PUCCH-ResourceStartOffset-r11, n' is determined from the antenna port used for EPDCCH transmission in subframe $n-k_m$.

If m=0, $\Delta_{ARO}$ is determined from the HARQ-ACK resource offset field in the DCI format of the corresponding EPDCCH as given in Table (5). If m>0, $\Delta_{ARO}$ is determined from the HARQ-ACK resource offset field in the DCI format of the corresponding EPDCCH as given in Table (6). If the UE 102 is configured to monitor EPDCCH in subframe $n-k_{i1}$, $N_{ECCE,q,n-k_{i1}}$ is equal to the number of ECCEs in EPDCCH-PRB-set q configured for that UE 102 in subframe $n-k_{i1}$. If the UE 102 is not configured to monitor EPDCCH in subframe $n-k_{i1}$, $N_{ECCE,q,n-k_{i1}}$ is equal to the number of ECCEs computed assuming EPDCCH-PRB-set q is configured for that UE 102 in subframe $n-k_{i1}$.

For normal downlink CP, if subframe $n-k_{i1}$ is a special subframe with special subframe configuration 0 or 5, $N_{ECCE,q,n-k_{i1}}$ is equal to 0. For extended downlink CP, if subframe $n-k_{i1}$ is a special subframe with special subframe configuration 0 or 4 or 7, $N_{ECCE,q,n-k_{i1}}$ is equal to 0. If at least one serving cell is configured with eIMTA, and one or more valid UL/DL configuration(s) in the UL/DL reconfiguration DCI with eIMTA-RNTI for at least one of the configured eIMTA cell(s) corresponding to a subframe for the PUCCH resource is not detected, δ is a fixed or predefined or RRC configured offset, otherwise δ is 0.

For a UE 102 configured with a transmission mode that supports up to two transport blocks on the primary cell, the PUCCH resource $n_{PUCCH,2}^{(1)}$ is determined as $n_{PUCCH,2}^{(1)} = n_{PUCCH,1}^{(1)} + 1 + \delta$. HARQ-ACK(0) is the ACK/NACK/DTX response for the PDSCH without a corresponding EPDCCH detected. HARQ-ACK(1) is the ACK/NACK/DTX response for the first transport block of the PDSCH indicated by the detection of a corresponding EPDCCH for which the value of the DAI field in the corresponding DCI format is equal to 1 or for the EPDCCH indicating downlink SPS release for which the value of the DAI field in the corresponding DCI format is equal to 1. HARQ-ACK(2) is the ACK/NACK/DTX response for the second transport block of the PDSCH indicated by the detection of a corresponding EPDCCH for which the value of the DAI field in the corresponding DCI format is equal to 1.

With another alternative implementation, the fallback HARQ-ACK to PUCCH format 1a/1b may be the same as normal operation. Thus, the PUCCH format 1a/1b resource may be determined by the PUCCH resource allocation methods defined for eIMTA. Since in fallback mode operation, the UE 102 monitors fixed DL and special subframes specified by SIB1 configuration, only the PUCCH resources for the fixed DL and special subframes in SIB1 configuration are used and shared with Rel-8/9/10/11/12 UEs 102. Based on the PUCCH resource used to carry the HARQ-ACK reporting, the eNB 160 can identify missing PDSCH detections in other subframes, e.g. the flexible subframes. However, the eNB 160 cannot determine whether the misdetection is caused by channel conditions or misdetection of the reconfiguration DCI.

Figure 9:
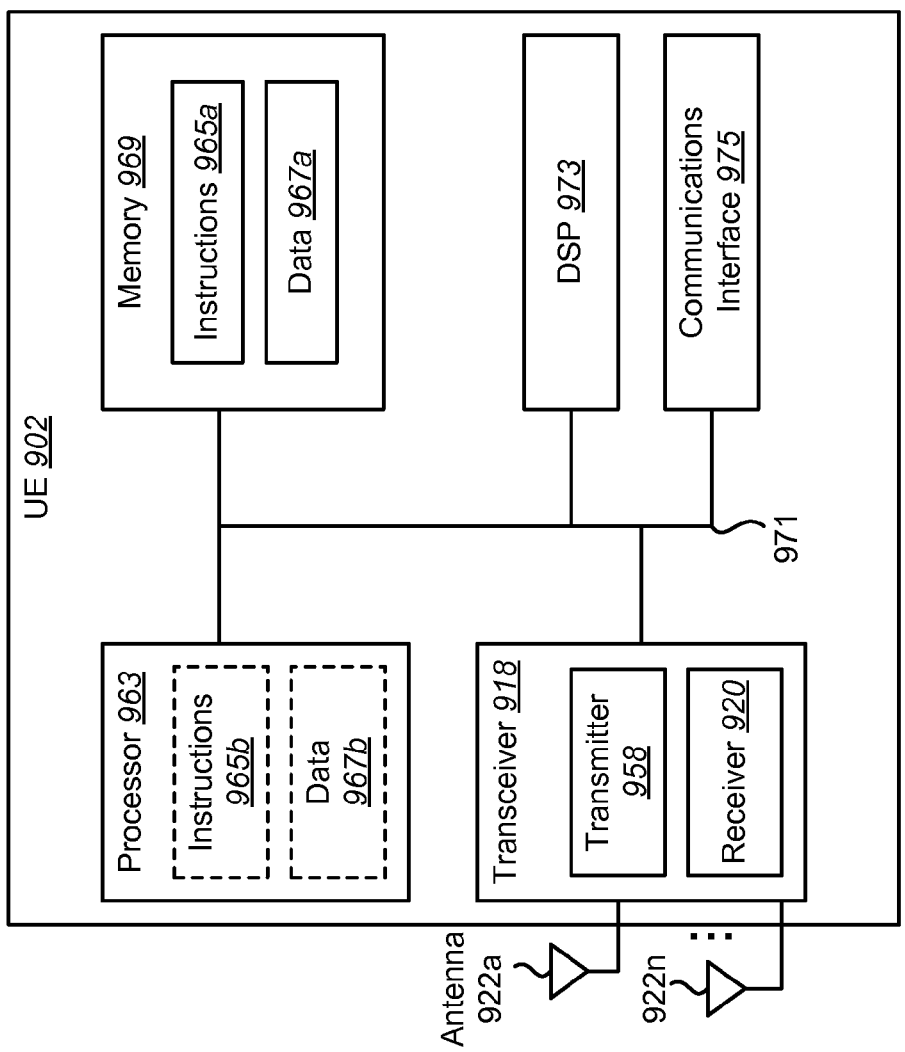
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1. The UE 902 includes a processor 963 that controls operation of the UE 902. The processor 963 may also be referred to as a central processing unit (CPU). Memory 969, which may include read-only memory (ROM), random access memory (RAM), a combination of the two or any type of device that may store information, provides instructions 965a and data 967a to the processor 963. A portion of the memory 969 may also include non-volatile random access memory (NVRAM). Instructions 965b and data 967b may also reside in the processor 963. Instructions 965b and/or data 967b loaded into the processor 963 may also include instructions 965a and/or data 967a from memory 969 that were loaded for execution or processing by the processor 963. The instructions 965b may be executed by the processor 963 to implement one or more of the methods 200, 600, 700 and 800 described above.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 971, which may include a power bus, a control signal bus and a status signal bus, in addition to a data bus. However, for the sake of clarity, the various buses are illustrated in FIG. 9 as the bus system 971. The UE 902 may also include a digital signal processor (DSP) 973 for use in processing signals. The UE 902 may also include a communications interface 975 that provides user access to the functions of the UE 902. The UE 902 illustrated in FIG. 9 is a functional block diagram rather than a listing of specific components.

Figure 10:
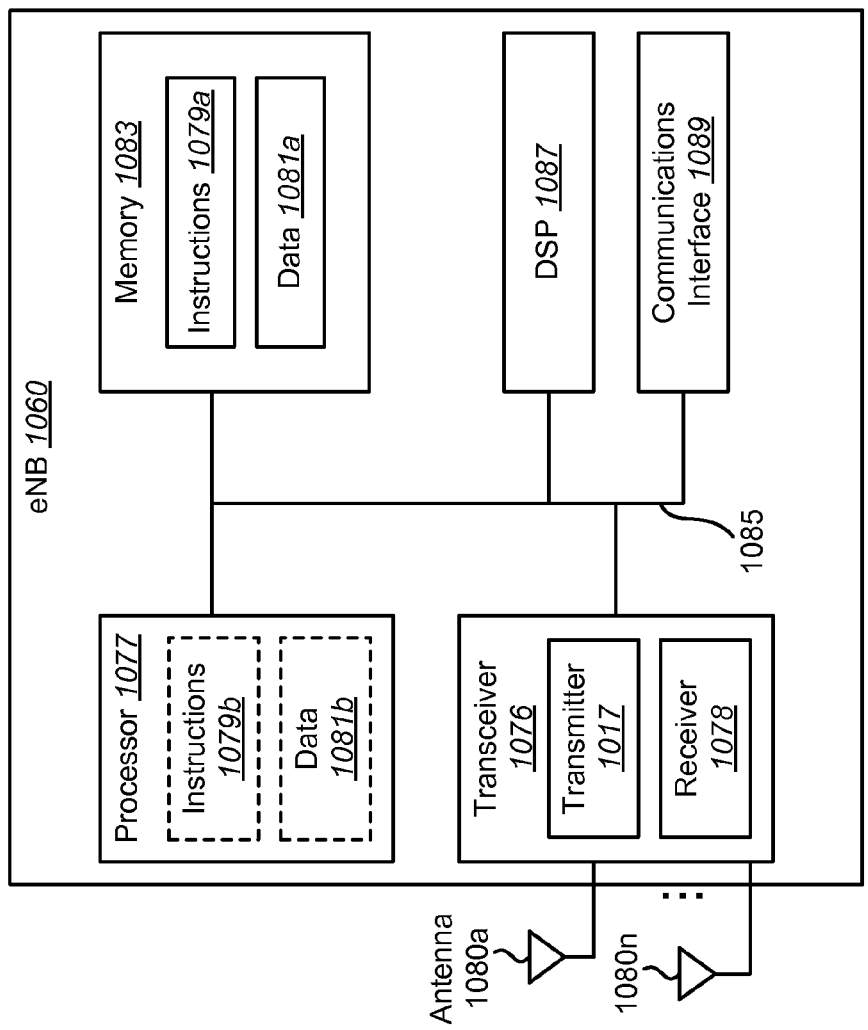
FIG. 10 illustrates various components that may be utilized in an eNB.

FIG. 10 illustrates various components that may be utilized in an eNB 1060. The eNB 1060 described in connection with FIG. 10 may be implemented in accordance with the eNB 160 described in connection with FIG. 1. The eNB 1060 includes a processor 1077 that controls operation of the eNB 1060. The processor 1077 may also be referred to as a central processing unit (CPU). Memory 1083, which may include read-only memory (ROM), random access memory (RAM), a combination of the two or any type of device that may store information, provides instructions 1079a and data 1081a to the processor 1077. A portion of the memory 1083 may also include non-volatile random access memory (NVRAM). Instructions 1079b and data 1081b may also reside in the processor 1077. Instructions 1079b and/or data 1081b loaded into the processor 1077 may also include instructions 1079a and/or data 1081a from memory 1083 that were loaded for execution or processing by the processor 1077. The instructions 1079b may be executed by the processor 1077 to implement method 300 described above.

The eNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the eNB 1060 are coupled together by a bus system 1085, which may include a power bus, a control signal bus and a status signal bus, in addition to a data bus. However, for the sake of clarity, the various buses are illustrated in FIG. 10 as the bus system 1085. The eNB 1060 may also include a digital signal processor (DSP) 1087 for use in processing signals. The eNB 1060 may also include a communications interface 1089 that provides user access to the functions of the eNB 1060. The eNB 1060 illustrated in FIG. 10 is a functional block diagram rather than a listing of specific components.

Figure 11:
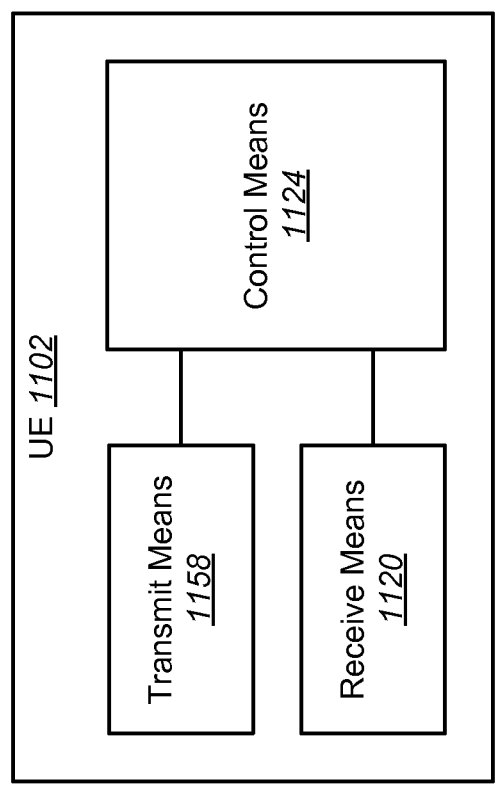
FIG. 11 is a block diagram illustrating one configuration of a UE in which systems and methods for feedback reporting may be implemented.

FIG. 11 is a block diagram illustrating one configuration of a UE 1102 in which systems and methods for feedback reporting may be implemented. The UE 1102 includes transmit means 1158, receive means 1120 and control means 1124. The transmit means 1158, receive means 1120 and control means 1124 may be configured to perform one or more of the functions described in connection with FIG. 2, FIG. 6, FIG. 7, FIG. 8 and FIG. 9 above. FIG. 9 above illustrates one example of a concrete apparatus structure of FIG. 11. Other various structures may be implemented to realize one or more of the functions of FIG. 2, FIG. 6, FIG. 7, FIG. 8 and FIG. 9. For example, a DSP may be realized by software.

Figure 12:
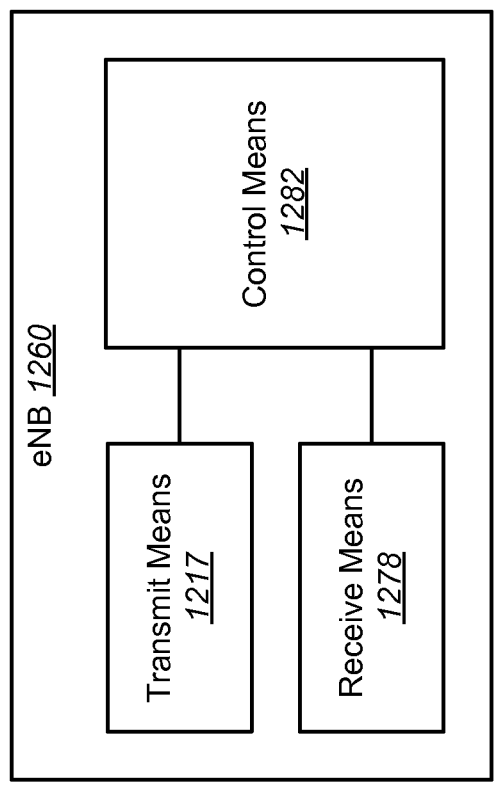
FIG. 12 is a block diagram illustrating one configuration of an eNB in which systems and methods for feedback reporting may be implemented.

FIG. 12 is a block diagram illustrating one configuration of an eNB 1260 in which systems and methods for feedback reporting may be implemented. The eNB 1260 includes transmit means 1217, receive means 1278 and control means 1282. The transmit means 1217, receive means 1278 and control means 1282 may be configured to perform one or more of the functions described in connection with FIG. 3 and FIG. 10 above. FIG. 10 above illustrates one example of a concrete apparatus structure of FIG. 12. Other various structures may be implemented to realize one or more of the functions of FIG. 3 and FIG. 10. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE), comprising:
    a processor; and
    memory in electronic communication with the processor, wherein instructions stored in the memory are executable to:
        decode an uplink/downlink (UL/DL) reconfiguration downlink control information (DCI) with an enhanced interference mitigation with traffic adaptation (eIMTA)-radio network temporary identifier (RNTI) on a physical downlink control channel (PDCCH);
        determine if one or more valid UL/DL configurations in the UL/DL reconfiguration DCI with eIMTA-RNTI for all configured eIMTA cells are received;
        determine if physical uplink control channel (PUCCH) format 3 is configured;
        determine a PUCCH resource for physical downlink shared channel (PDSCH) hybrid automatic repeat request acknowledgement/negative acknowledgement (HARQ-ACK) reporting, the PUCCH resource being determined by whether valid UL/DL configurations in the UL/DL reconfiguration DCI with eIMTA-RNTI for all of the configured eIMTA cells corresponding to a subframe for the PUCCH resource are received; and
        send PDSCH HARQ-ACK information on the selected PUCCH resource in an uplink subframe.

2. The UE of claim 1, wherein if PUCCH format 3 is configured and valid UL/DL configurations in the UL/DL reconfiguration DCI with eIMTA-RNTI for all of the configured eIMTA cells corresponding to a subframe for the PUCCH resource are received, then the instructions are further executable to:
    determine the PDSCH HARQ-ACK information based on at least one of a DL subframe and a special subframe according to the UL/DL configuration in the UL/DL reconfiguration DCI in a DL association set for a given UL subframe of each configured eIMTA cell.

3. The UE of claim 1, wherein if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received, then the instructions are further executable to:
    determine the PDSCH HARQ-ACK information based on at least one of a DL subframe and a special subframe according to a system information block type 1 (SIB1) configuration in a DL association set according to a DL HARQ reference configuration for a given UL subframe of each configured eIMTA cell, wherein the SIB1 configuration comprises a UL/DL configuration in SIB1 signaling or RadioResourceConfigCommon signaling when a configured eIMTA cell is a primary cell (PCell), and wherein the SIB1 configuration comprises a UL/DL configuration in RadioResourceConfigCommonSCell-r10 signaling when a configured eIMTA cell is a secondary cell (SCell).

4. The UE of claim 1, wherein if PUCCH format 3 is configured and a valid UL/DL configuration in the UL/DL reconfiguration DCI with eIMTA-RNTI for at least one configured eIMTA cell corresponding to a subframe for the PUCCH resource is not received, then the instructions are further executable to:
  determine the PDSCH HARQ-ACK information based on a DL association set according to a DL HARQ reference configuration for a given UL subframe of each configured eIMTA cell.

5. The UE of claim 1, wherein if valid UL/DL configurations in the UL/DL reconfiguration DCI with eIMTA-RNTI of all configured eIMTA cells corresponding to a subframe for the PUCCH resource are received, then the instructions executable to determine the PUCCH resource comprise instructions executable to determine the PUCCH resource based on at least one of a Transmitter Power Control (TPC) field and an acknowledgment resource offset (ARO).

6. The UE of claim 5, wherein:
  if a PDSCH is detected on a secondary cell (SCell) in a DL assignment by PDCCH/enhanced physical downlink control channel (EPDCCH), or a downlink assignment index (DAI) value is greater than 1 in a detected PDCCH on a primary cell (PCell), then the instructions are further executable to:
    determine a PUCCH format 3 resource based on a Transmitter Power Control (TPC) field in a PDCCH/EPDCCH assignment with a DAI value greater than 1;
  if there is no PDSCH detected on an SCell and a DAI value is greater than 1 in a detected EPDCCH on a PCell, then the instructions are further executable to:
    determine a PUCCH format 3 resource based on a HARQ-ACK resource offset field in a DCI format of a corresponding EPDCCH assignment with a DAI value greater than 1; and
  if there is only one PDSCH detected with a DAI value of 1, excluding semi-persistent scheduling (SPS) on a PCell, then the instructions are further executable to:
    determine a PUCCH format 1a/1b resource based on the number of control channel elements (CCE).

7. The UE of claim 1, wherein if at least one valid UL/DL configuration in the UL/DL reconfiguration DCI with eIMTA-RNTI for at least one configured eIMTA cell corresponding to a subframe for the PUCCH resource is not received, then the instructions executable to determine the PUCCH resource comprise instructions executable to determine the PUCCH resource based on at least one of a predefined offset or a separate PUCCH resource.

8. The UE of claim 7, wherein:
  if a PDSCH is detected on a secondary cell (SCell) in a DL assignment by PDCCH/EPDCCH, or a downlink assignment index (DAI) value is greater than 1 in a detected PDCCH on a primary cell (PCell), then the instructions are further executable to:
    determine a PUCCH format 3 resource based on a predefined offset or a separate PUCCH resource and a Transmitter Power Control (TPC) field in a PDCCH/EPDCCH assignment with a DAI value greater than 1;
  if there is no PDSCH detected on an SCell and a DAI value is greater than 1 in a detected EPDCCH on a PCell, then the instructions are further executable to:
    determine a PUCCH format 3 resource based on at least one of a predefined offset or a separate PUCCH resource and a HARQ-ACK resource offset field in a DCI format of a corresponding EPDCCH assignment with a DAI value greater than 1; and
  if there is only one PDSCH detected with a DAI value of 1, excluding semi-persistent scheduling (SPS) on a PCell, then the instructions are further executable to:
    determine a PUCCH format 1a/1b resource based on the number of control channel elements (CCE).

9. The UE of claim 1, wherein if valid UL/DL configurations in the UL/DL reconfiguration DCI with eIMTA-RNTI for all of the configured eIMTA cells corresponding to a subframe for the PUCCH resource are received, then the instructions executable to determine the PUCCH resource further comprise instructions executable to determine the PUCCH resource based on at least one of a predefined offset or a separate PUCCH resource.

10. The UE of claim 9, wherein:
  if a PDSCH is detected on a secondary cell (SCell) in a DL assignment by PDCCH/EPDCCH, or a downlink assignment index (DAI) value is greater than 1 in a detected PDCCH on a primary cell (PCell), then the instructions are further executable to:
    determine a PUCCH format 3 resource based on at least one of a predefined offset or a separate PUCCH resource and a Transmitter Power Control (TPC) field in a PDCCH/EPDCCH assignment with a DAI value greater than 1;
  if there is no PDSCH detected on an SCell and a DAI value is greater than 1 in a detected EPDCCH on a PCell, then the instructions are further executable to:
    determine a PUCCH format 3 resource based on at least one of a predefined offset or a separate PUCCH resource and a HARQ-ACK resource offset field in a DCI format of a corresponding EPDCCH assignment with a DAI value greater than 1; and
  if there is only one PDSCH detected with a DAI value of 1, excluding semi-persistent scheduling (SPS), on a PCell, then the instructions are further executable to:
    determine a PUCCH format 1a/1b resource based on the number of control channel elements (CCE).

11. The UE of claim 1, wherein if at least one valid UL/DL configuration in the UL/DL reconfiguration DCI with eIMTA-RNTI for at least one configured eIMTA cell corresponding to a subframe for the PUCCH resource is not received, then the instructions executable to determine the PUCCH resource comprise instructions executable to determine the PUCCH resource based on at least one of a Transmitter Power Control (TPC) field and an acknowledgment resource offset (ARO).

12. The UE of claim 11, wherein:
  if a PDSCH is detected on a secondary cell (SCell) in a DL assignment by PDCCH/EPDCCH or a downlink assignment index (DAI) value is greater than 1 in a detected PDCCH on a primary cell (PCell), then the instructions are further executable to:
    determine a PUCCH format 3 resource based on a Transmitter Power Control (TPC) field in a PDCCH/EPDCCH assignment with a DAI value greater than 1;
  if there is no PDSCH detected on a secondary cell (SCell) and a DAI value greater than 1 in a detected EPDCCH on a PCell, then the instructions are further executable to:
    determine a PUCCH format 3 resource based on a HARQ-ACK resource offset field in a DCI format of a corresponding EPDCCH assignment with a DAI value greater than 1; and
  if there is only one PDSCH detected with a DAI value of 1, excluding semi-persistent scheduling (SPS), on a PCell, then the instructions are further executable to:
    determine a PUCCH format 1a/1b resource based on the number of control channel elements (CCE).

13. A method performed by a user equipment (UE), comprising:
- decoding an uplink/downlink (UL/DL) reconfiguration downlink control information (DCI) with an enhanced interference mitigation with traffic adaptation (eIMTA)-radio network temporary identifier (RNTI) on a physical downlink control channel (PDCCH);
- determining if one or more valid UL/DL configurations in the UL/DL reconfiguration DCI with eIMTA-RNTI for all configured eIMTA cells are received;
- determining if physical uplink control channel (PUCCH) format 3 is configured;
- determining a PUCCH resource for physical downlink shared channel (PDSCH) hybrid automatic repeat request acknowledgement/negative acknowledgement (HARQ-ACK) reporting, the PUCCH resource being determined by whether valid UL/DL configurations in the UL/DL reconfiguration DCI with eIMTA-RNTI for all of the configured eIMTA cells corresponding to a subframe for the PUCCH resource are received; and
- sending PDSCH HARQ-ACK information on the selected PUCCH resource in an uplink subframe.

14. The method of claim 13, wherein if PUCCH format 3 is configured and one or more valid UL/DL configurations in the UL/DL reconfiguration DCI with eIMTA-RNTI for at least one of the one or more configured eIMTA cells corresponding to a subframe for the PUCCH resource is not received, then the method further comprises:
- determining the PDSCH HARQ-ACK information based on at least one of a DL subframe and a special subframe according to a system information block type 1 (SIB1) configuration in a DL association set according to a DL HARQ reference configuration for a given UL subframe of each configured eIMTA cell, wherein the SIB1 configuration comprises a UL/DL configuration in SIB1 signaling or RadioResourceConfigCommon signaling when a configured eIMTA cell is a primary cell (PCell), and wherein the SIB1 configuration comprises a UL/DL configuration in RadioResourceConfigCommonSCell-r10 signaling when a configured eIMTA cell is a secondary cell (SCell).

15. The method of claim 13, wherein if PUCCH format 3 is configured and a valid UL/DL configuration in the UL/DL reconfiguration DCI with eIMTA-RNTI for at least one configured eIMTA cell corresponding to a subframe for the PUCCH resource is not received, then the method further comprises:
- determining the PDSCH HARQ-ACK information based on a DL association set according to a DL HARQ reference configuration for a given UL subframe of each configured eIMTA cell.

16. The method of claim 13, wherein if valid UL/DL configurations in the UL/DL reconfiguration DCI with eIMTA-RNTI of all configured eIMTA cells corresponding to a subframe for the PUCCH resource are received, then determining the PUCCH resource comprises determining the PUCCH resource based on at least one of a Transmitter Power Control (TPC) field and an acknowledgment resource offset (ARO).

17. The method of claim 16, wherein:
- if a PDSCH is detected on a secondary cell (SCell) in a DL assignment by PDCCH/enhanced physical downlink control channel (EPDCCH), or a downlink assignment index (DAI) value is greater than 1 in a detected PDCCH on a primary cell (PCell), then the method further comprises:
  - determining a PUCCH format 3 resource based on a Transmitter Power Control (TPC) field in a PDCCH/EPDCCH assignment with a DAI value greater than 1;
- if there is no PDSCH detected on an SCell and a DAI value is greater than 1 in a detected EPDCCH on a PCell, then the method further comprises:
  - determining a PUCCH format 3 resource based on a HARQ-ACK resource offset field in a DCI format of a corresponding EPDCCH assignment with a DAI value greater than 1; and
- if there is only one PDSCH detected with a DAI value of 1, excluding semi-persistent scheduling (SPS) on a PCell, then the method further comprises:
  - determining a PUCCH format 1a/1b resource based on the number of control channel elements (CCE).

18. The method of claim 13, wherein if at least one valid UL/DL configuration in the UL/DL reconfiguration DCI with eIMTA-RNTI for at least one configured eIMTA cell corresponding to a subframe for the PUCCH resource is not received, then determining the PUCCH resource comprises determining the PUCCH resource based on at least one of a predefined offset or a separate PUCCH resource.

19. The method of claim 18, wherein:
- if a PDSCH is detected on a secondary cell (SCell) in a DL assignment by PDCCH/EPDCCH, or a downlink assignment index (DAI) value is greater than 1 in a detected PDCCH on a primary cell (PCell), then the method further comprises:
  - determining a PUCCH format 3 resource based on a predefined offset or a separate PUCCH resource and a Transmitter Power Control (TPC) field in a PDCCH/EPDCCH assignment with a DAI value greater than 1;
- if there is no PDSCH detected on an SCell and a DAI value is greater than 1 in a detected EPDCCH on a PCell, then the method further comprises:
  - determining a PUCCH format 3 resource based on at least one of a predefined offset or a separate PUCCH resource and a HARQ-ACK resource offset field in a DCI format of a corresponding EPDCCH assignment with a DAI value greater than 1; and
- if there is only one PDSCH detected with a DAI value of 1, excluding semi-persistent scheduling (SPS) on a PCell, then the method further comprises:
  - determining a PUCCH format 1a/1b resource based on the number of control channel elements (CCE).

* * * * *